(12) United States Patent
Hong et al.

(10) Patent No.: US 11,708,498 B2
(45) Date of Patent: Jul. 25, 2023

(54) PHOTOCURABLE RESIN COMPOSITION, METHOD FOR PREPARING THE SAME, AND OPTICAL FILM COMPRISING THE SAME

(71) Applicants: SHIN-A T&C, Seoul (KR); UNIAM, Seoul (KR)

(72) Inventors: Seung Mo Hong, Incheon (KR); Jin Han Song, Seoul (KR); Sung Hun Choi, Cheonan-si (KR); Won Jong Song, Paju-si (KR); In Won Lee, Seoul (KR)

(73) Assignees: SHTN-A T&C, Seoul (KR); UNIAM, Seoul (KR)

( * ) Notice: Subject to any disclaimer, the term of this patent is extended or adjusted under 35 U.S.C. 154(b) by 911 days.

(21) Appl. No.: 16/695,615

(22) Filed: Nov. 26, 2019

(65) Prior Publication Data
US 2020/0165467 A1 May 28, 2020

(30) Foreign Application Priority Data

Nov. 27, 2018 (KR) .................. 10-2018-0148135
Nov. 27, 2018 (KR) .................. 10-2018-0148136

(51) Int. Cl.
| | |
|---|---|
| C09D 5/22 | (2006.01) |
| C09D 181/02 | (2006.01) |
| C08L 33/08 | (2006.01) |
| C08F 220/12 | (2006.01) |
| C09K 11/70 | (2006.01) |
| C09K 11/08 | (2006.01) |
| C08G 75/045 | (2016.01) |
| C09K 11/02 | (2006.01) |

(Continued)

(52) U.S. Cl.
CPC ............. *C09D 5/22* (2013.01); *C08G 75/045* (2013.01); *C09D 181/02* (2013.01); *C09K 11/025* (2013.01); *C09K 11/0883* (2013.01); *C09K 11/703* (2013.01); *B82Y 20/00* (2013.01); *B82Y 40/00* (2013.01)

(58) Field of Classification Search
CPC ........ C08F 230/02; C08F 220/12–1818; C08L 33/08; C08L 33/10; C08L 33/12; C09D 181/02; C09D 5/22
See application file for complete search history.

(56) References Cited

U.S. PATENT DOCUMENTS

| | | | |
|---|---|---|---|
| 2007/0258687 | A1 | 11/2007 | Yamamoto et al. |
| 2016/0161066 | A1 | 6/2016 | Sung et al. |

(Continued)

FOREIGN PATENT DOCUMENTS

| | | |
|---|---|---|
| CN | 102939321 A | 2/2013 |
| CN | 105131201 A | 12/2015 |

(Continued)

*Primary Examiner* — Matthew E. Hoban
(74) *Attorney, Agent, or Firm* — Sughrue Mion, PLLC

(57) ABSTRACT

The present invention relates to a photocurable resin composition, a method for preparing the same, and an optical film comprising the same, more specifically, the photocurable resin composition comprises organophosphate-based (meth)acrylate; and a phenolic compound or a phosphate compound containing phenolic —OH. Thus, since the photocurable resin composition can ensure storage stability, it is suitable as a material for a transparent display.

20 Claims, 3 Drawing Sheets

(51) Int. Cl.
　　　*B82Y 40/00*　　　　(2011.01)
　　　*B82Y 20/00*　　　　(2011.01)

(56) References Cited

U.S. PATENT DOCUMENTS

| | | | |
|---|---|---|---|
| 2017/0022414 | A1 | 1/2017 | Boogaerts et al. |
| 2019/0040175 | A1 | 2/2019 | Onishi et al. |
| 2021/0355260 | A1* | 11/2021 | Eryazici ............... C08L 83/04 |

FOREIGN PATENT DOCUMENTS

| | | | |
|---|---|---|---|
| CN | 105793324 | A | 7/2016 |
| JP | 2004-035734 | A | 2/2004 |
| JP | 2004-211057 | A | 7/2004 |
| JP | 5647533 | B2 | 12/2014 |
| JP | 10-2017-0106048 | A | 9/2017 |
| JP | 6260278 | B2 | 1/2018 |
| KR | 10-2016-0104458 | A | 9/2016 |
| KR | 10-1686713 | B1 | 12/2016 |
| KR | 10-1788168 | B1 | 10/2017 |
| KR | 10-2018-0075653 | A | 7/2018 |

\* cited by examiner

[Figure 1]
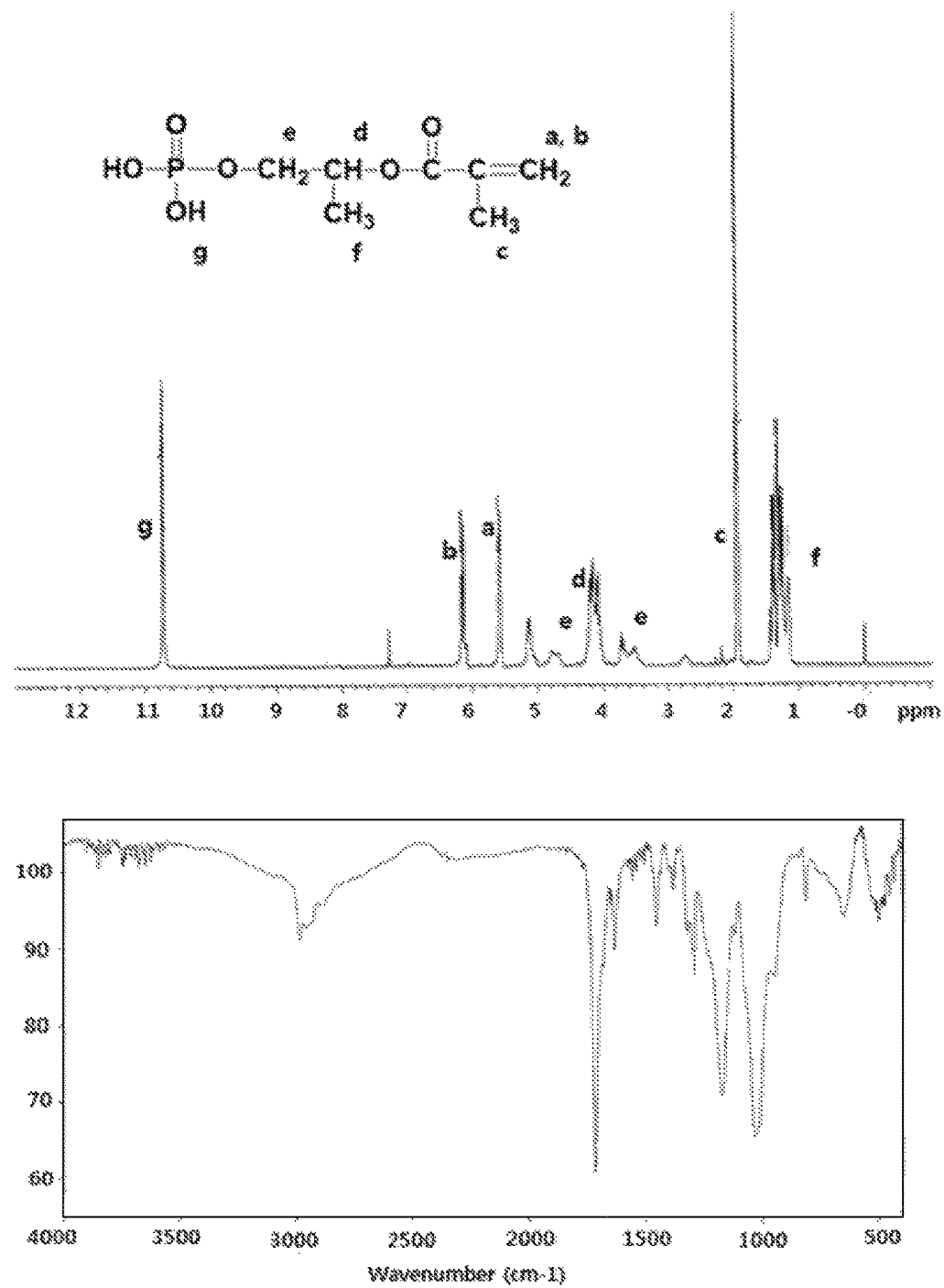

[Figure 2]
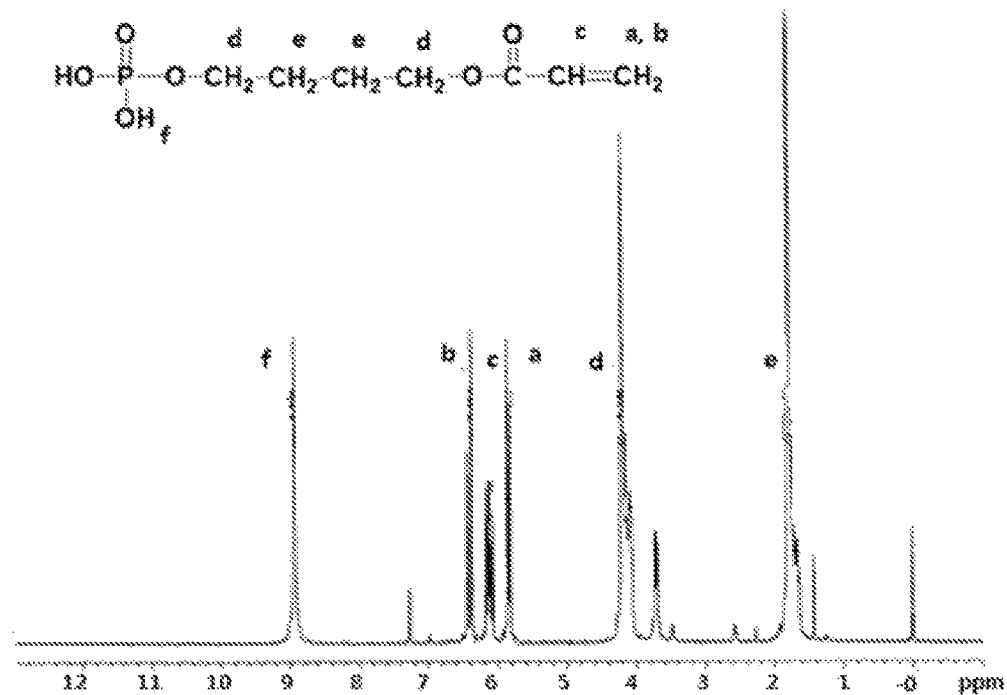
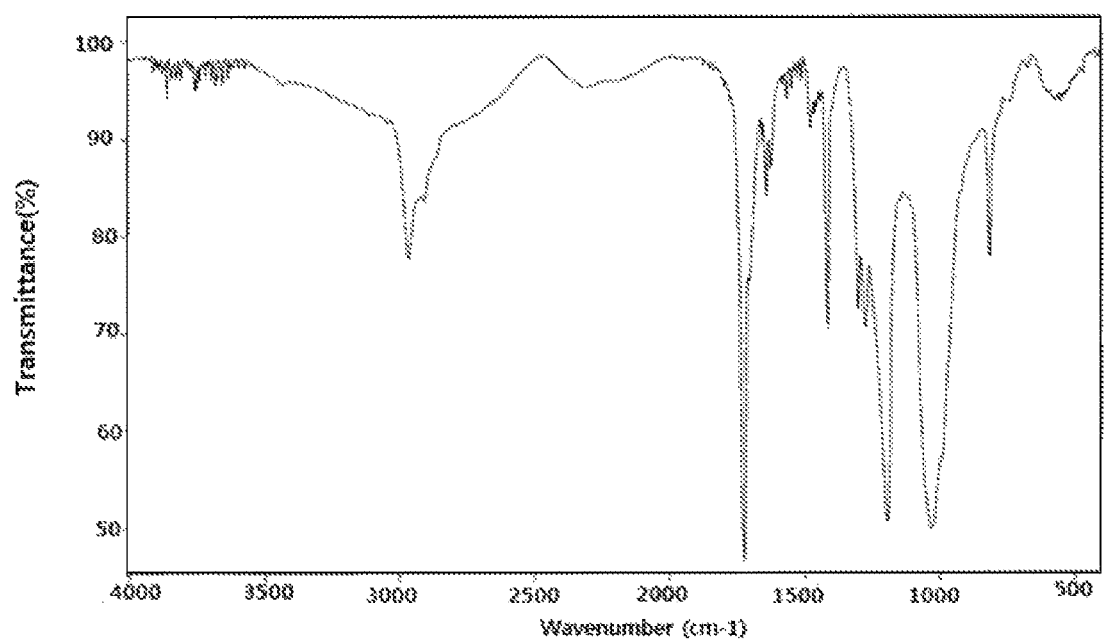

【Figure 3】
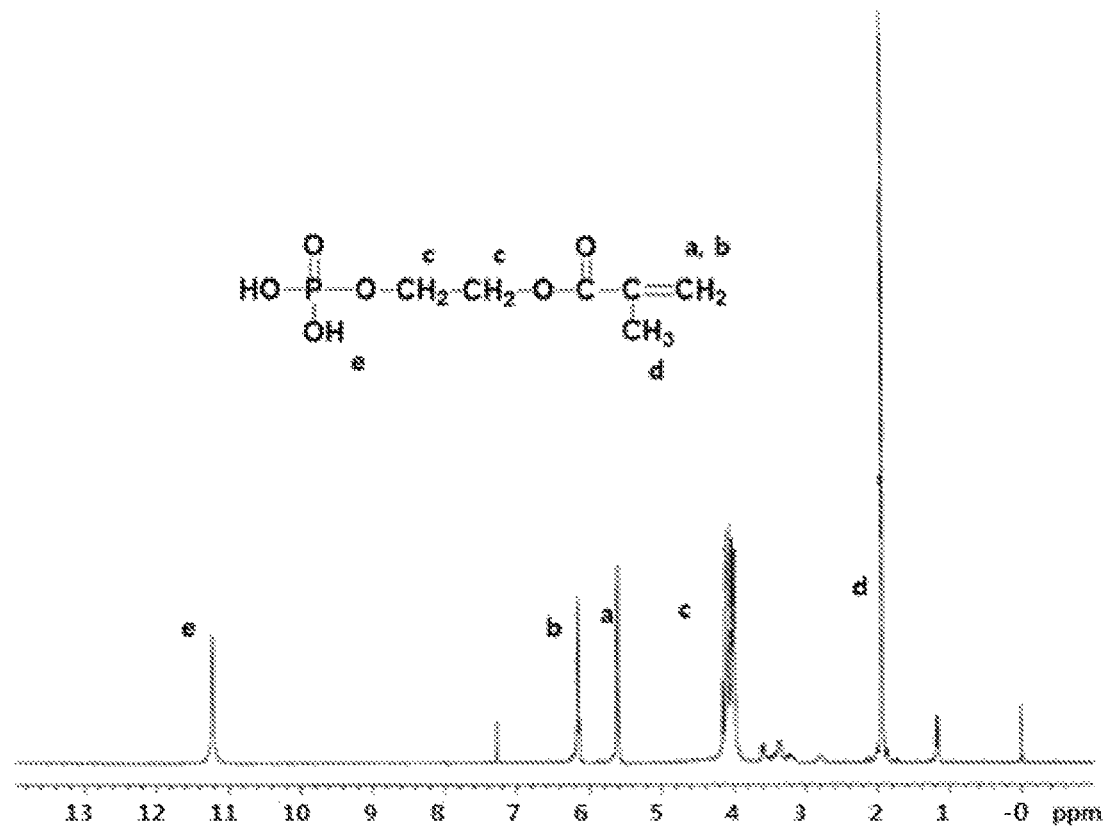
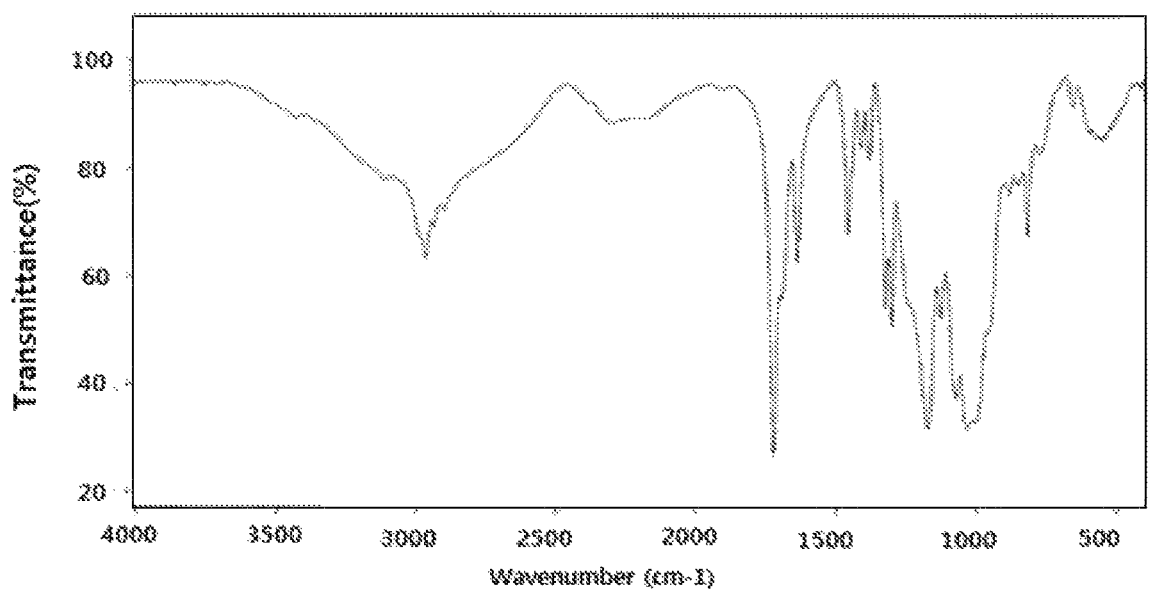

PHOTOCURABLE RESIN COMPOSITION, METHOD FOR PREPARING THE SAME, AND OPTICAL FILM COMPRISING THE SAME

TECHNICAL FIELD

This application claims the benefit of priorities based on Korean Patent Application No. 10-2018-0148135 filed on Nov. 27, 2018, and Korean Patent Application No. 10-2018-0148136 filed on Nov. 27, 2018, and the entire contents of which are incorporated herein by reference.

The present invention relates to a photocurable resin composition having enhanced stability, a method for preparing the same, and an optical film comprising the same.

BACKGROUND ART

Quantum dots are nanoparticles having a size of several tens of nanometers or less having semiconductor properties, and have different properties from bulk particles due to quantum confinement effects. Specifically, the band gaps may vary according to the size of the quantum dots, thereby changing the wavelength to be absorbed, and the quantum confinement effects due to the small size exhibit new optical, electrical, and physical properties which cannot be found in bulk materials. Therefore, research is actively being carried out on a technique for preparing a photoelectric conversion element such as a solar cell (solar battery) and a light emitting diode using such a quantum dot.

However, since the quantum dot itself is vulnerable to moisture and oxygen to have a problem that the stability is not good, attempts to compensate such problems have continued in the field of quantum dot film production using the quantum dot as a raw material.

The quantum dot film can be produced by a process of laminating a first substrate and a second substrate (hereinafter, referred to as a barrier layer) through ultraviolet curing using a polymer matrix in which quantum dot particles are dispersed. Since the barrier layer is characterized in that it is coated with a metal oxide in order to prevent the penetration of moisture, most of the quantum dot film is prepared using a photocurable compound containing a hydrogen bonding functional group having excellent adhesion to the metal oxide.

However, although such a film can secure adhesion to the barrier layer, it exhibits a vulnerability to moisture and oxygen, which causes deterioration of reliability in the quantum dot film. In order to compensate this drawback, a method of using curing of a thiol alkene compound system has been proposed. In the case of the thiol alkene compound systems, the photoinitiator initiates a radical reaction by ultraviolet rays, the alkene resin is polymerized, and thiols and radicals generated in the alkene resin are cured by another curing mechanism through the chain transfer reaction and the Michael reaction of the thiol and the olefin to implement the interpenetrating polymer network (IPN) structure, thereby remarkably reducing curing shrinkage and securing adhesion between barrier layers by bonding thiols with metal oxides.

In addition, thiol has a hydrogen bonding property, but has a hydrophobic property, thereby having the advantage of preventing the penetration of moisture and oxygen. Despite this advantage, thiol and alkene compounds have a problem of storage stability that thickens or gels upon mixing. Regardless of the presence or absence of any initiator, since the thiol-ene reaction proceeds as a spontaneous dark reaction (Dark Reaction), in particular, the reaction proceeds by heat or light, if it is not used immediately after mixing, it is difficult to use and there are a lot of restrictions on mass production.

Japanese Patent Publication No. 2004-035734 refers to an active energy containing an N-nitroso compound in a thio-ene composition. In particular, as the N-nitroso compound, compounds such as aluminum N-nitrosophenylhydroxylamine and N-nitrosophenylhydroxylamine are used, but the compounds are carcinogenic substances and its use is extremely limited. In addition, the compositions are improved in stability at room temperature but not perfect and less effective at high temperatures.

Japanese Patent No. 5647533 describes a thiol compound, an ethylenically unsaturated double bond-containing compound having two or more unsaturated double bond groups, and 4-methoxy-1-naphthol as a naphthalene compound containing a hydroxyl group and an alkyl(alkoxy) group. However, the 4-methoxy-1-naphthol has an effect on a secondary thiol, such as pentaerythritol tetrakis (3-mercaptobutylate) having relatively poor reactivity with a double bond, and has a slight effect on a primary thiol. It also has little effect at high temperatures and lacks color for use as an optical material.

Korean Patent Publication No. 2018-0075653 discloses a thio-ene composition comprising a compound having a pKa value of 5.0 or less as a reaction inhibitor, a compound having a benzene ring and/or a naphthalene ring containing a hydroxyl group as a radical polymerization inhibitor, and water, thereby imparting stability. However, since acid compounds having a pKa value of 5 or less have a problem of compatibility with thiol compounds, it is difficult to obtain a transparent cured product, thereby leading to a problem in the application of an optical material that must be accompanied by transparency, and it is difficult to apply to display materials in which deformation is easily caused by water when water is used.

As such, researches to compensate the stability of the quantum dots have been actively carried out, but the problems that are vulnerable to moisture and oxygen have not been completely improved, and thus, there is a need for technology development to secure stability of quantum dots.

PRIOR ART DOCUMENT

Patent Documents (Patent Document 1) Japanese Patent Publication No. 2004-035734
(Patent Document 2) Japanese Patent No. 5647533
(Patent Document 3) Korean Patent Publication No. 2018-0075653

DISCLOSURE

Technical Problem

As a result of conducting various studies to solve the above problems, the present inventors prepared a photocurable resin composition using an organophosphate-based (meth)acrylate compound and a phenolic compound; and a phenolic compound or a phosphate compound containing phenolic —OH, and the photocurable resin composition may have an excellent storage stability to secure a long pot life.

Accordingly, it is an object of the present invention to provide a photocurable resin composition having enhanced stability and a method for preparing the same.

Technical Solution

In order to achieve the above object, the present invention provides a photocurable resin composition comprising a (meth)acrylate compound (A); a thiol compound containing two or more mercapto groups in one molecule (B); and a photoinitiator (C),
wherein the photocurable resin composition comprises an organophosphate-based (meth)acrylate represented by following Chemical Formula 1; and a phenolic compound represented by following Chemical Formula 2 or 3, or a phosphate compound represented by following Chemical Formula 4 and containing phenolic —OH:

[Chemical Formula 1]

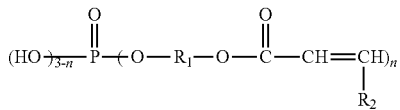

in Chemical Formula 1, $R_1$ is selected from following Chemical Formulas 1-1, 1-2, 1-3, and 1-4, $R_2$ is hydrogen or methyl, and n is an integer of 1 to 3:

[Chemical Formula 1-1]
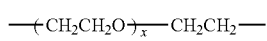

[Chemical Formula 1-2]
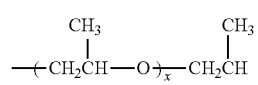

[Chemical Formula 1-3]
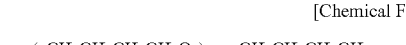

[Chemical Formula 1-4]
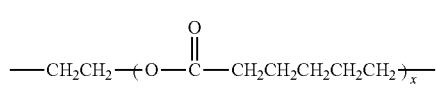

in Chemical Formulas 1-1 to 1-4, X may be each independently same or different and is an integer of 0 to 10;

[Chemical Formula 2]
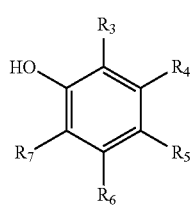

[Chemical Formula 3]
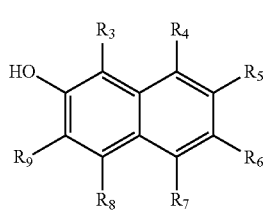

in Chemical Formulas 2 and 3, $R_3$ to $R_9$ may be each independently same or different and are hydrogen, —OH, —COOH, a straight or branched $C_1$ to $C_{10}$ alkyl, a straight or branched $C_1$ to $C_{10}$ alkoxyalkyl, or a straight or branched $C_1$ to $C_{10}$ alkyl containing an ester group;

[Chemical Formula 4]
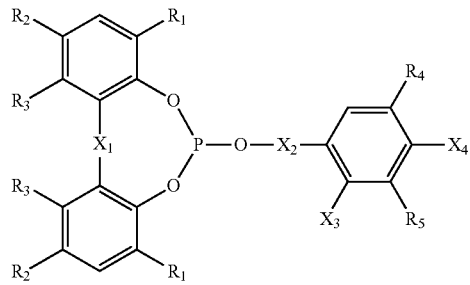

in Chemical Formula 4, $R_1$ to $R_5$ each independently represent hydrogen, an alkyl group having 3 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $X_1$ is a direct bond, oxygen, sulfur, or an alkylene group having 1 to 8 carbon atoms, $X_2$ is an alkylene group having 2 to 8 carbon atoms, and at least one of $X_3$ and $X_4$ is always a hydroxyl group and is hydrogen, an alkyl group having 1 to 8 carbon atoms, an alkoxy group having 1 to 8 carbon atoms, or an aralkyloxy group having 7 to 12 carbon atoms.

The present invention further provides a method of preparing a photocurable resin composition, the method comprising: (S1) the step of removing moisture from a mixture of a (meth)acrylate compound (A); a thiol compound containing two or more mercapto groups in one molecule (B); a photoinitiator (C); organophosphate-based (meth)acrylate represented by Chemical Formula 1 above; and a phenolic compound represented by Chemical Formula 2 or 3 above, or a phosphate compound represented by Chemical Formula 4 above and containing phenolic —OH.

The present invention further provides an optical film comprising the photocurable resin composition.

Advantageous Effects

The photocurable resin composition according to the present invention exhibits stable properties regardless of temperature, that is, even at high temperature as well as at low temperature and at room temperature, thereby having excellent storage stability to secure a long pot life.

Since the photocurable resin composition which exhibits such stable properties comprises an organophosphate-based compound and a phenolic compound; or an organophosphate-based compound and a phosphate compound containing phenolic —OH, it is not large in the viscosity change, thereby having excellent storage stability and having excellent luminance even at high temperature and high humidity.

In addition, the optical film made of the photocurable resin composition is excellent in the adhesion of the angle contained therein, has excellent luminance even at high temperature and high humidity and hardly has a color change even in a severe environment, and thus is suitable as a material of a transparent display.

DESCRIPTION OF DRAWINGS

FIG. 1 shows H-NMR and FT-IR graphs of an organophosphate-based compound obtained in Synthesis Example 1.

FIG. 2 shows 1H-NMR and FT-IR graphs of an organophosphate-based compound obtained in Synthesis Example 2.

FIG. 3 shows H-NMR and FT-IR graphs of an organophosphate-based compound obtained in Synthesis Example 3.

BEST MODE

Hereinafter, the present invention will be described in more detail in order to facilitate understanding of the present invention.

The terms and words as used in the present specification and claims should not be construed as limited to conventional or dictionary meanings, but should be construed as the meaning and concept consistent with the technical idea of the present invention based on the principle that the inventor can appropriately define the concept of the term to describe its own invention in the best way.

Photocurable Resin Composition

The present invention relates to a photocurable resin composition in which stability is enhanced by mixing an organophosphate-based (meth)acrylate and a phenolic compound, or an organophosphate-based (meth)acrylate and a phosphate compound containing phenolic —OH, which can act as a radical polymerization inhibitor, to a thio-ene composition comprising a thiol compound and an alkene compound, which has been used as a conventional photocurable resin composition. Wherein, the thiol compound means a compound containing a mercapto group or a thiol group, and the alkene compound means a compound containing an ethylenic carbon-carbon double bond.

For example, the "thio-ene composition" in the present invention means a mixture comprising a (meth)acrylate compound (A); and a thiol compound containing two or more mercapto groups in one molecule (B).

The present invention relates to a photocurable resin composition comprising a (meth)acrylate compound (A); a thiol compound containing two or more mercapto groups in one molecule (B); and a photoinitiator (C), wherein the photocurable resin composition comprises an organophosphate-based (meth)acrylate represented by following Chemical Formula 1; and a phenolic compound represented by following Chemical Formula 2 or 3, or a phosphate compound represented by following Chemical Formula 4 and containing phenolic —OH, and wherein the photocurable resin composition may further comprise one or more selected from a quantum dot particle (D) and a scattered particle (E):

[Chemical Formula 1]

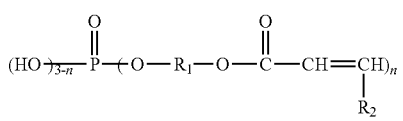

in Chemical Formula 1, $R_1$ is selected from following Chemical Formulas 1-1, 1-2, 1-3, and 1-4, $R_2$ is hydrogen or methyl, and n is an integer of 1 to 3:

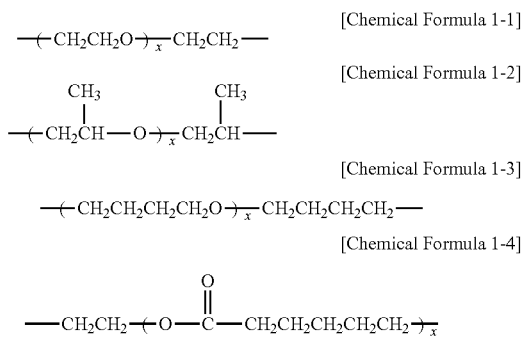

[Chemical Formula 1-1]
[Chemical Formula 1-2]
[Chemical Formula 1-3]
[Chemical Formula 1-4]

in Chemical Formulas 1-1 to 1-4, X may be each independently same or different and is an integer of 0 to 10;

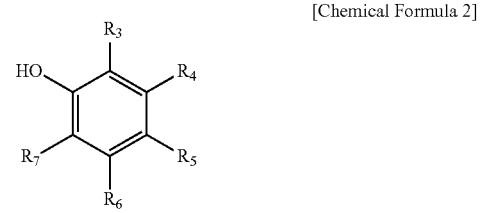

[Chemical Formula 2]

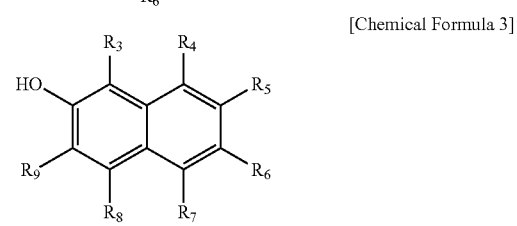

[Chemical Formula 3]

in Chemical Formulas 2 and 3, $R_3$ to $R_9$ may be each independently same or different and are hydrogen, —OH, —COOH, a straight or branched $C_1$ to $C_{10}$ alkyl, a straight or branched $C_1$ to $C_{10}$ alkoxyalkyl, or a straight or branched $C_1$ to $C_{10}$ alkyl containing an ester group;

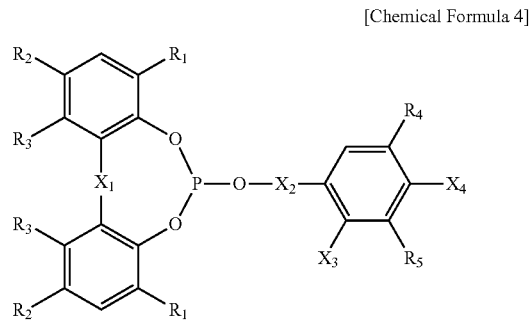

[Chemical Formula 4]

in Chemical Formula 4, $R_1$ to $R_5$ each independently represent hydrogen, an alkyl group having 3 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $X_1$ is a direct bond, oxygen, sulfur, or an alkylene group having 1 to 8 carbon atoms, $X_2$ is an alkylene group having 2 to 8 carbon atoms, and at least one of $X_3$ and $X_4$ is always a hydroxyl group and is hydrogen, an alkyl group having 1 to 8 carbon atoms, an alkoxy group having 1 to 8 carbon atoms, or an aralkyloxy group having 7 to 12 carbon atoms.

In the present invention, the organophosphate-based (meth)acrylate represented by Chemical Formula 1 above may be defined as phosphoric acid to which a (meth)acryl group is introduced. The organophosphate-based (meth) acrylate represented by Chemical Formula 1 above has excellent compatibility when mixed with a thio-ene composition and contains a reactive group, thereby securing reliability of the composition to be prepared.

In addition, the organophosphate-based (meth)acrylate represented by Chemical Formula 1 above may be present in the form of one (meth)acrylate, or a mixture of two or more (meth)acrylates.

In addition, the organophosphate-based (meth)acrylate represented by Chemical Formula 1 above may be a mixture of methacryloyloxyethyl dihydrogen phosphate and dimethacryloyloxyethyl hydrogen phosphate; a mixture of acryloyloxyethyl dihydrogen phosphate and diacryloyloxyethyl hydrogen phosphate; a mixture of methacryloyloxypropyl dihydrogen phosphate and dimethacryloyloxypropyl hydrogen phosphate; a mixture of acryloyloxypropyl dihydrogen phosphate and diacryloyloxypropyl hydrogen phosphate; a mixture of methacryloyloxybutyl dihydrogen phosphate and dimethacryloyloxybutyl hydrogen phosphate; and a mixture of acryloyloxybutyl dihydrogen phosphate and diacryloyloxybutyl hydrogen phosphate. Preferably, it may be one or more selected from the group consisting of a mixture of methacryloyloxyethyl dihydrogen phosphate and dimethacryloyloxyethyl hydrogen phosphate; a mixture of methacryloyloxypropyl dihydrogen phosphate and dimethacryloyloxypropyl hydrogen phosphate; and a mixture of acryloyloxybutyl dihydrogen phosphate and diacryloyloxybutyl hydrogen phosphate.

In addition, the organophosphate-based (meth)acrylate represented by Chemical Formula 1 above may be comprised in an amount of 0.01 to 5% by weight, preferably 0.05 to 3% by weight, more preferably 0.1 to 2% by weight, based on the total weight of the photocurable resin composition. If it is less than the above range, the stability of the thio-ene composition cannot be secured, and if it is more than the above range, the moisture absorption is large, and thus cannot be applied to a display material vulnerable to moisture.

In the present invention, the phenolic compound represented by Chemical Formula 2 or 3 above may act as a radical polymerization inhibitor, thereby further securing the storage stability of the thio-ene composition.

The phenolic compound represented by Chemical Formula 2 or 3 above may be a compound having a benzene ring or a naphthalene ring to which one or more hydroxyl groups are bonded, more preferably a compound having a benzene ring or a naphthalene ring to which two or more hydroxyl groups are bonded.

In addition, the phenolic compound represented by Chemical Formula 2 or 3 above may be one or more selected from the group consisting of pyrogallol; propyl-3,4,5-trihydroxybenzene; 2,4,5-trihydroxy butyrophenone; hydroquinone; catechol; tert-butyl catechol; gallic acid; ester compound of gallic acid (ethyl gallate, propyl gallate, octyl gallate, dodecyl calate, and the like); toluhydroquinone; mono-tert-butylhydroquinone; 2,5-di-tert-butylhydroquinone; 4-methoxyphenol; 4-methoxy-1-naphthol; 1,4-dihydroxynaphthalene; 4-methoxy-2-methyl-1-naphthol; 4-methoxy-3-methyl-naphthol; 1,2-dihydroxynaphthalene; 1,4-dimethoxy-2-naphthol; and 1,4-dihydroxy-2-methyl-naphthalene; and may be preferably one or more selected from the group consisting of pyrogallol, toluhydroquinone, 4-methoxyphenol, and 4-methoxy-1-naphthol.

In addition, the phenolic compound represented by Chemical Formula 2 or 3 above may be comprised in an amount of 0.01 to 5% by weight, preferably 0.05 to 3% by weight, more preferably 0.1 to 2% by weight, based on the total weight of the photocurable resin composition. If it is less than the above range, the stability of the thio-ene composition cannot be secured, and if it is more than the above range, it is not completely dissolved due to the nature of the chemical structure, and thus may cause a problem in appearance or may cause a problem in curability during ultraviolet irradiation.

In the present invention, in the phosphate compound represented by Chemical Formula 4 above and containing phenolic —OH, the alkyl group having 3 to 8 carbon atoms in $R_1$ to $R_5$ specifically includes an n-propyl group, an isopropyl group, an n-butyl group, an isobutyl group, a sec-butyl group, a tert-butyl group, a tert-pentyl group, an isooctyl group, a tert-octyl group, and a 2-ethylhexyl group. Examples of the cycloalkyl group having 5 to 8 carbon atoms include a cyclopentyl group, a cyclohexyl group, a cycloheptyl group, and a cyclooctyl group. Examples of the alkylcycloalkyl group having 6 to 12 carbon atoms include 1-methylcyclopentyl group, 1-methylcyclohexyl group, and 1-methyl-4-isopropylcyclohexyl group. In addition, examples of the aralkyl group having 7 to 12 carbon atoms include a benzyl group, an α-methylbenzyl group, and an α,α-dimethylbenzyl group.

Preferably, $R_1$, $R_2$, and $R_4$ are independently an alkyl group having 1 to 8 carbon atoms, a cycloalkyl group having 5 to 8 carbon atoms, or an alkylcycloalkyl group having 6 to 12 carbon atoms. More preferably, $R_1$ and $R_4$ are independently a tert-alkyl group, for example, a tert-butyl group, a tert-pentyl group, and a tert-octyl group, a cyclohexyl group, a 1-methylcyclohexyl group, or the like.

$R_2$ is preferably an alkyl group having 1 to 5 carbon atoms, for example, an ethyl group, an n-propyl group, an isopropyl group, an n-butyl group, an isobutyl group, a sec-butyl group, or a tert-pentyl group, more preferably a methyl group, a tert-butyl group, a tert-pentyl group, or the like.

$R_3$ and $R_5$ are preferably a hydrogen atom or an alkyl group having 1 to 8 carbon atoms, for example, a methyl group, an ethyl group, an n-propyl group, an isopropyl group, an n-butyl group, an isobutyl group, a sec-butyl group, a tert-butyl group, a tert-pentyl group, an isooctyl group, a tert-octyl group, or a 2-ethylhexyl group, more preferably a hydrogen atom or a methyl group.

$X_1$ is preferably a direct bond, methyl, or ethyl, more preferably a direct bond. $X_2$ is preferably an C2-C8 alkylene group, and examples thereof include an ethylene group, a propylene group, a butylene group, a pentamethylene group, a hexamethylene group, an octamethylene group, and a 2,2-dimethyl-1,3-propylene group, and of them a propylene group is most preferred. One of $X_3$ and $X_4$ represents a hydroxyl group, an alkyl group of 1 to 8 carbon atoms, an alkoxyl group of 1 to 8 carbon atoms, or an aralkyloxy group having 7 to 12 carbon atoms, and the other of $X_3$ and $X_4$ represents a hydrogen atom or an alkyl group having 1 to 8 carbon atoms.

In this connection, the alkyl group having 1 to 8 carbon atom includes a n-propyl group, an isopropyl group, an n-butyl group, an isobutyl group, a sec-butyl group, a tert-butyl group, a tert-pentyl group, an isooctyl group, a tert-octyl group, and a 2-ethylhexyl group. Examples of the alkoxyl group having 1 to 8 carbon atoms include a methoxy group, an ethoxy group, an n-propoxy group, an isopropoxy group, an n-butoxy group, an isobutoxy group, a sec-butoxy group, a tert-butoxy group, a tert-pentoxy group, an isooctoxy group, a tert-octoxy group, and a 2-ethylhexoxy group. Examples of the aralkyloxy group having 7 to 12 carbon atoms include a benzyloxy group, an α-methylbenzyloxy group, and an α,α-dimethylbenzyloxy group. In $X_3$ and $X_4$, $X_3$ may be a hydroxyl group, an alkyl group having 1 to 8 carbon atoms, an alkoxyl group having 1 to 8 carbon atoms, or an aralkyloxy group having 7 to 12 carbon atoms, while $X_4$ may be a hydrogen atom or an alkyl group having 1 to 8 carbon atoms. Alternatively, in $X_3$ and $X_4$, $X_4$ may be a hydroxyl group, an alkyl group having 1 to 8 carbon atoms, an alkoxyl group having 1 to 8 carbon atoms, or an aralkyloxy group having 7 to 12 carbon atoms, while $X_3$ may be a hydrogen atom or an alkyl group having 1 to 8 carbon atoms.

Of the phosphate compounds represented by Chemical Formula 4 above and containing phenolic —OH, the compounds are particularly preferred, wherein $R_1$ and $R_4$ are a tert-alkyl group, a cyclohexyl group, or a 1-methylcyclohexyl group, $R_2$ is an alkyl group having 1 to 5 carbon atoms, $R_5$ is a hydrogen atom or an alkyl group having 1 to 5 carbon atoms, $R_3$ is a hydrogen atom or an alkyl group having 1 to 5 carbon atoms, $X_1$ is a direct bond, and $X_2$ is an alkylene group having 2 to 8 carbon atoms.

In addition, examples of the phosphate compound represented by Chemical Formula 4 above and containing phenolic —OH include the following compounds. It may be a compound selected from the group consisting of
2,4,8,10-tetra-tert-butyl-6-[3-(3-methyl-4-hydroxy-5-tert-butylphenyl)propoxy]dibenzo[d,f][1,3,2]dioxaphosphepine,
2,10-dimethyl-4,8-di-tert-butyl-6-[3-(3,5-di-tert-butyl-4-hydroxyphenyl)propoxy]-12H-dimenzo[d,g][1,3,2]dioxaphosphosine,
2,4,8,10-tetra-tert-butyl-6-[3-(3,5-di-tert-butyl-4-hydroxyphenyl)propoxy]dibenzo[d,f][1,3,2]dioxaphosphepine,
2,4,8,10-tetra-tert-pentyl-6-[3-(3,5-di-tert-butyl-4-hydroxyphenyl)propoxy]-12-methyl-12H-dibenzo[d,g][1,3,2]dioxaphosphosine,
2,10-dimethyl-4,8-di-tert-butyl-6-[3-(3,5-di-tert-butyl-4-hydroxyphenyl)propionyloxy]-12H-dibenzo[d,g][1,3,2]dioxaphosphosine,
2,4,8,10-tetra-tert-pentyl-6-[3-(3,5-di-tert-butyl-4-hydroxyphenyl)propionyloxy]-12-methyl-12H-dibenzo[d,g][1,3,2]dioxaphosphosine,
2,4,8,10-tetra-tert-butyl-6-[3-(3,5-di-tert-butyl-4-hydroxyphenyl)propionyloxy]-dibenzo[d,f][1,3,2]dioxaphosphepine,
2,10-dimethyl-4,8-di-tert-butyl-6-(3,5-di-tert-butyl-4-hydroxybenzoyloxy)-12H-dibenzo[d,g][1,3,2]dioxaphosphosine,
2,4,8,10-tetra-tert-butyl-6-(3,5-di-tert-butyl-4-hydroxybenzoyloxy)-12-methyl-12H-dibenzo[d,g][1,3,2]dioxaphosphosine,
2,10-dimethyl-4,8-di-tert-butyl-6-[3-(3-methyl-4-hydroxy-5-tert-butylphenyl)propoxy]-12H-dibenzo[d,g][1,3,2]dioxaphosphosine,
2,4,8,10-tetra-tert-butyl-6-[3-(3,5-di-tert-butyl-4-hydroxyphenyl)propoxy]-12H-dibenzo[d,g][1,3,2]dioxaphosphosine,
2,10-diethyl-4,8-di-tert-butyl-6-[3-(3,5-di-tert-butyl-4-hydroxyphenyl)propoxy-12H-dibenzo[d,g][1,3,2]dioxaphosphosine, and
2,4,8,10-tetra-tert-butyl-6-[2,2-dimethyl-3-(3-tert-butyl-4-hydroxy-5-methylphenyl)propoxy]-dibenzo[d,f][1,3,2]dioxaphosphepine.

In addition, the phosphate compound represented by Chemical Formula 4 above and containing phenolic —OH may be prepared by the method disclosed in Japanese Patent No. 3876479 B2, but is not limited thereto.

In addition, the phosphate compound represented by Chemical Formula 4 above and containing phenolic —OH may be comprised in an amount of 0.1 to 10% by weight, preferably 0.3 to 8% by weight, more preferably 0.5 to 6% by weight, based on the total weight of the photocurable resin composition. If it is less than the above range, the stability of the thio-ene composition cannot be secured, and if it is more than the above range, it may affect the appearance quality due to problems such as precipitation and may cause a problem in curability during ultraviolet irradiation, and thus cannot be applied to the display material.

In the present invention, the (meth)acrylate compound (A) may be one more selected from the group consisting of a (meth)acrylated monomer, a urethane (meth)acrylate oligomer, a polyester (meth)acrylate oligomer, and an epoxy (meth)acrylate oligomer, but is not limited thereto, and any (meth)acrylate compound commonly used in the art may be used without limitation.

The (meth)acrylated monomer may be prepared by ester condensation of an aliphatic alcohol with a (meth)acrylic acid. Depending on the number of aliphatic alcohols, it may be mono-, bi-, tri-, tetra-, penta- or hexa-functional (meth) acrylate monomer. As representative examples thereof, (meth)acrylic acid, ethylene glycol di(meth)acrylate, ethoxylated bisphenol A di(meth)acrylate ester, isosorbide di(meth)acrylate, tris(2-hydroxyethyl)isocyanurate tri(meth)acrylate and di(meth)acrylate, alkyl (for example. isobornyl, isodecyl, isobutyl, n-butyl, tert-butyl, methyl, ethyl, tetrahydrofurfuryl, cyclohexyl, n-hexyl, isooctyl, 2-ethylhexyl, n-lauryl, octyl, or decyl) of acrylic acid or methacrylic acid, hydroxy alkyl (for example, 2-hydroxyethyl and hydroxy propyl) ester (meth)acrylate, phenoxyethyl(meth)acrylate, nonylphenol ethoxylate mono(meth)acrylate, 2-(2-ethoxyethoxy)ethyl (meth)acrylate, 2-butoxyethyl (meth)acrylate, butylene glycol di(meth)acrylate and tri(meth)acrylate, 1,6-hexanediol di(meth)acrylate, ethoxylated and/or propoxylated hexanediol di(meth)acrylate, ethoxylated bisphenol A diacrylate, sorbitol di(meth)acrylate, glycerol tri(meth)acrylate and ethoxylated and/or propoxylated derivatives thereof, bisphenol A di(meth)acrylate and ethoxylated and/or propoxylated derivatives thereof, tricyclodecane di(meth)acrylate, tricyclodecane dimethanol di(meth)acrylate, pentaerythritol di(meth)acrylate and tri(meth)acrylate and tetra (meth)acrylate and ethoxylated and/or propoxylated derivatives thereof, ethylene glycol di(meth)acrylate, diethylene glycol di(meth)acrylate, triethylene glycol di(meth)acrylate, tetraethylene glycol di(meth)acrylate, propylene glycol di(meth)acrylate, tripropylene glycol di(meth)acrylate, tetramethylene glycol di(meth)acrylate, neopentyl glycol di(meth)acrylate, ethoxylated and/or propoxylated neopentyl glycol di(meth)acrylate, hexamethylene glycol di(meth)acrylate, 4,4'-bis(2-acryloyloxyethoxy)diphenylpropane, trimethylolpropane di(meth)acrylate, trimethylolpropane tri(meth)acrylate and ethoxylated and/or propoxylated derivatives thereof, dipentaerythritol tetra(meth)acrylate and penta(meth)acrylate and hexa(meth)acrylate and ethoxylated and/or propoxylated derivatives thereof, and the like may be used.

Moreover, the urethane (meth)acrylates generally have 2 to 15 (meth)acrylate functional groups. The urethane (meth)

acrylates are generally obtained from the reaction of one or more polyisocyanates, one or more (meth)acrylate functional groups containing one or more (generally one) reactive groups that can react with isocyanate groups, and optionally one or more compounds containing two or more reactive groups that can react with isocyanate groups. The reactive groups that can react with isocyanate groups are generally hydroxyl groups. As examples thereof, products such as Miramer® PU240, Miramer® PU256, Miramer® PU2100, Miramer® UA5095, Miramer® PU3200, Miramer® PU3210, Miramer® PU330, Miramer® PU340, Miramer® PU370, Miramer® PU3410, Miramer® PU664, Miramer® SC2100, Miramer® SC2153, Miramer® SC2152 (hereinbefore, Miwon Specialty Chemical Co., Ltd.), EBECRYL® 4883, EBECRYL® 9384, EBECRYL® 1290, EBECRYL 220® (hereinbefore, Alex Co., Ltd.), UV-3510TL, UV3000B, UV3310B, UV-7510B, UV-7600B, UV-1700B (hereinbefore, Nippon Kosei Co., Ltd.) may be purchased and used selectively.

In addition, the polyester (meth)acrylates are generally obtained from ester reactions of one or more polyols with one or more (meth)acrylic acids. The acrylic acid and methacrylic acid are preferably used alone or in combination. Suitable polyester (meth)acrylates are, for example, aliphatic or aromatic polyhydric polyols that are fully esterified with (meth)acrylic acid and may contain residual hydroxyl functional groups in the molecule, and an easy and suitable way to characterize a product is to determine its hydroxyl value (mg KOH/g). Suitable are partial or total esterification products of (meth)acrylic acid with di- to hexa-valent polyols or mixtures thereof. In addition, reaction products of polyols as described above with ethylene oxides and/or propylene oxides or mixtures thereof, or reaction products of polyols as described above with lactones and lactides may be used. As examples thereof, products such as Miramer® PS420, Miramer® PS430, Miramer® PS460, Miramer® PS610 (hereinbefore, Miwon Specialty Chemical Co., Ltd.), EBECRYL®870, EBECRYL® 657, EBECRYL®450, EBECRYL®800, EBECRYL®884, EBECRYL®885, EBECRYL®810, EBECRYL®830 (hereinbefore, Alex Co., Ltd.) may be purchased and used selectively.

In addition, the epoxy (meth)acrylates are generally obtained from the reaction of one or more polyepoxy compounds with one or more (meth)acrylic acids. The acrylic acid and methacrylic acid are preferably used alone or in combination. Examples of suitable epoxy (meth) acrylate oligomers are di(meth)acrylates of diglycidyl ethers of bisphenol A, and variants thereof, for example, EBECRYL®3700 or EBECRYL®600, EBECRYL®3701, EBECRYL®3703, EBECRYL®3708, EBECRYL® 3720 and EBECRYL® 3639 (hereinbefore, Alex Co., Ltd.), Miramer® PE210, Miramer® PE2120A, Miramer® PE250 (hereinbefore, Miwon Specialty Chemical Co., Ltd.).

The (meth)acrylate compound (A) may be comprised in an amount of 50 to 80% by weight, preferably 50 to 75% by weight, more preferably 50 to 70% by weight, based on the total weight of the photocurable resin composition. If it is less than the above range, the stability of the thio-ene composition cannot be secured, and if it is more than the above range, it is not completely dissolved due to the nature of the chemical structure, and thus may cause a problem in appearance or may cause a problem in curability during ultraviolet irradiation.

In the present invention, the thiol compound containing two or more mercapto groups (—SH) in one molecule (B) comprises a primary and a secondary mercapto group (—SH) and may comprise —SH having two or more functional groups in the molecule.

The thiol compound containing two or more mercapto groups (—SH) in one molecule (B) may be comprised in an amount of 15 to 45% by weight, preferably 18 to 42% by weight, more preferably 20 to 40% by weight, based on the total weight of the photocurable resin composition. If it is less than the above range, the stability of the thio-ene composition cannot be secured, and if it is more than the above range, it is not completely dissolved due to the nature of the chemical structure, and thus may cause a problem in appearance or may cause a problem in curability during ultraviolet irradiation.

In addition, the thiol compound containing two or more mercapto groups (—SH) in one molecule (B) may be comprised in an amount of 0.2 to 1.0 equivalent, more preferably 0.3 to 0.8 equivalent, based on 1 equivalent of the (meth)acrylate mixture (A). If it is less than the above range, the stability of the thio-ene composition cannot be secured, and if it is more than the above range, it is not completely dissolved due to the nature of the chemical structure, and thus may cause a problem in appearance or may cause a problem in curability during ultraviolet irradiation.

In addition, the thiol compound containing two or more mercapto groups in one molecule (B) may be one or more selected from the group consisting of a polythiol, an aliphatic polythiol, an aromatic polythiol, and an ester polythiol.

In the present invention, the photoinitiator (C) may induce the formation of the photocurable resin composition through photocuring.

The photoinitiator (C) may comprise one or more selected from the group consisting of an acylphosphine oxide-based photoinitiator and a photoinitiator other than the acylphosphine oxide-based photoinitiator.

The acylphosphine oxide-based photoinitiator has a characteristic of exhibiting activity at long wavelengths, and may be one or more selected from the group consisting of bis(2,4,6-trimethylbenzoyl)-phenylphosphine oxide (Irgacure 819; IGM Co., Ltd.); 2,4,6-tribenzoyldiphenylphosphine oxide (Darocure TPO; IGM Co., Ltd.); and ethyl-2, 4,6-triethylbenzoylphenylphosphinate (TPO-L; IGM Co., Ltd.). The photoinitiator other than the acylphosphine oxide-based photoinitiator may be one or more selected from the group consisting of an α-hydroxyalkylphenone-based photoinitiator; an α-aminoalkylphenone-based photoinitiator; a benzoineether-based photoinitiator; an α,α-dialkoxyacetophenone-based photoinitiator; and a phenylglyoxylate-based photoinitiator, and may be preferably one or more selected from 1-hydroxycyclohexyl-phenyl-ketone (Irgacure 184; IGM Co., Ltd.) and 2-hydroxy-2-methyl-1-phenyl-1-propanone (Irgacure 1173; IGM Co., Ltd.), which are α-hydroxyalkylphenone-based photoinitiators.

The total amount of the photoinitiator (C) may be 0.1 to 10% by weight, preferably 0.5 to 8% by weight, more preferably 1 to 5% by weight, based on the total weight of the photocurable resin composition. If it is less than the above range, a poor curing may occur, and if it is more than the above range, problems in durability may occur due to yellowing phenomenon and poor curing density.

In the present invention, for example, the quantum dot particle (D) may comprise a core layer and a shell layer located outside the core layer, wherein at least one of the core layer and the shell layer may be doped with at least one of aluminum, silicon, titanium, magnesium, and zinc, and the core layer may comprise Groups III-V compounds.

Group III-V compounds of the core layer include, for example, binary compounds selected from the group consisting of GaN, GaP, GaAs, GaSb, AlN, AlP, AlAs, AlSb, InN, InP, InAs, InSb, and a mixture thereof; ternary compound selected from the group consisting of GaNP, GaNAs, GaNSb, GaPAs, GaPSb, AlNP, AlNAs, AlNSb, AlPAs AlPSb, InNP, InNAs, InNSb, InPAs, InPSb, and mixtures thereof; and quaternary compounds selected from the group consisting of GaAlNAs, GaAlNSb, GaAlPAs, GaAlPSb, GaInNP, GaInNAs, GaInNSb, GaInPAs, GaInPSb, GaAlNP, InAlNP, InAlNAs, InAlNSb, InAlPAs, InAlPSb, and mixtures thereof.

In addition, in the quantum dot particle (D), for example, the core layer may comprise In and P, and the shell layer may comprise one or more selected from Zn, Se, and S and may further comprise a nonpolar ligand having 5 to 30 carbon atoms.

In addition, in the quantum dot particle (D), blue light may be converted into green light or red light depending on the particle size. The average particle diameter of the quantum dot particle (D) may be 1 to 100 nm, blue light is converted into green light as the average particle diameter is smaller within the above range, and blue light may be converted into red light as the average particle diameter is larger.

Specifically, the particles capable of converting the blue light into green light have a particle diameter of 3 to 12 nm, preferably 5 to 10 nm, and a maximum absorption wavelength of 530 to 550 nm. In addition, the particles capable of converting the blue light into red light have a particle diameter of 6 to 20 nm, preferably 8 to 15 nm, and a maximum absorption wavelength of 615 to 650 nm.

In addition, the quantum dot particle (D) may be 0.1 to 2% by weight, preferably 0.2 to 1.8% by weight, more preferably 0.5 to 1.5% by weight, based on the total weight of the photocurable resin composition. If it is less than the above range, the light emitting power may be lowered, and if it is more than the above range, the light emitting power may be excessive and thus not suitable as a material for the display field.

In addition, the quantum dot particles (D) are preferably used by mixing particles capable of converting blue light into green light with particles capable of converting blue light into red light in a ratio of 3:1 to 1:1. When the quantum dot particles (D) are mixed and used in a ratio within the above range, color conversion of light is smoothly performed, and thus the light emitting power may be excellent.

In the photocurable resin composition of the present invention, the scattered particle (E) may be used to secure uniformity of color.

In general, in order for light to be scattered, the scattering effect of the light may be increased as the difference between the refractive index of the scattered particles and the refractive index of the matrix resin after curing is increased. Wherein, the matrix resin means the cured product of the photocurable resin composition except a scattered particle.

In the present invention, the difference in refractive index between the scattered particles (E) and the matrix resin after curing may be 0.05 to 0.3, preferably 0.1 to 0.2. If it is less than the above range, since the internal scattering effect is halved, the content of the scattered particle (E) must be increased, and thus economic efficiency may be decreased and durability may be lowered. Wherein, the matrix resin means a (meth)acrylate compound (A); and a thiol compound containing two or more mercapto groups in one molecule (B).

The scattered particles (E) are one or more particles selected from the group consisting of silica, alumina, silicon, alumina, titanium dioxide ($TiO_2$), zirconia ($ZrO_2$), barium sulfate, zinc oxide (ZnO), poly(methylmethacrylate) (PMMA), and a benzoguanamine-based polymer.

In addition, the average particle diameter of the scattered particles (E) may be 10 to 100 nm, preferably 15 to 95 nm, more preferably 20 to 90 nm. If it is less than the above range, the scattering effect is lowered and the color uniformity is not good, and if it is more than the above range, the scattering effect is excessive, and thus the color uniformity is not good either.

In addition, the scattered particle (E) may be comprised in an amount of 0.1 to 15% by weight, preferably 0.2 to 10% by weight, more preferably 0.5 to 8% by weight, based on the total weight of the photocurable resin composition. If it is less than the above range, the scattering effect is lowered and the color uniformity is not good, and if it is more than the above range, the scattering effect is excessive, and thus the color uniformity is not good either.

In the present invention, the photocurable resin composition may have a viscosity change rate ($\Delta V$) defined by following Equation 1 of 2.0 or less:

$$\Delta V = V_2/V_1, \quad \text{[Equation 1]}$$

in Equation 1, $V_1$ is the initial viscosity at 25° C., and $V_2$ is the viscosity at 25° C. after stored for 30 days at 60° C.

Preferably, the viscosity change rate ($\Delta V$) defined by Equation 1 may be 1 to 2.0, more preferably 1 to 1.5, and the smaller the viscosity within the prescribed range may be advantageous. If it is more than the above range, the viscosity is excessively high, and thus it is difficult to apply uniformly during coating of the film, thereby making it difficult to secure luminance uniformity, which may be difficult to use as a display material.

Method for Preparing Photocurable Resin Composition

The present invention also relates to a method of preparing a photocurable resin composition, the method comprising: (S1) the step of removing moisture from a mixture of a (meth)acrylate compound (A); a thiol compound containing two or more mercapto groups in one molecule (B); a photoinitiator (C); an organophosphate-based (meth)acrylate represented by following Chemical Formula 1; and a phenolic compound represented by following Chemical Formula 2 or 3, or a phosphate compound represented by following Chemical Formula 4 and containing phenolic —OH, and wherein after the step (S1), the method may further comprise: (S2) the step of adding a quantum dot particle (D) and a scattered particle (E) to the mixture from which the moisture is removed, and mixing them.

[Chemical Formula 1]

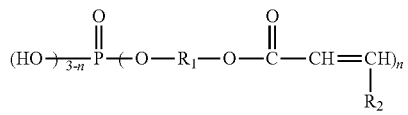

in Chemical Formula 1, $R_1$ is selected from following Chemical Formulas 1-1, 1-2, 1-3, and 1-4, $R_2$ is hydrogen or methyl, and n is an integer of 1 to 3:

[Chemical Formula 1-1]

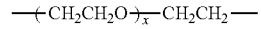

-continued

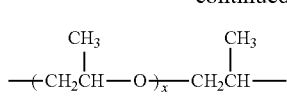
[Chemical Formula 1-2]

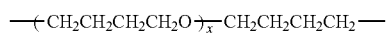
[Chemical Formula 1-3]

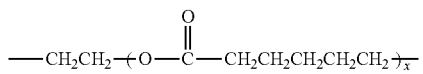
[Chemical Formula 1-4]

in Chemical Formulas 1-1 to 1-4, X may be each independently same or different and is an integer of 0 to 10;

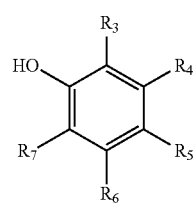
[Chemical Formula 2]

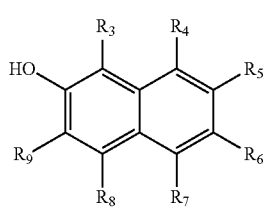
[Chemical Formula 3]

in Chemical Formulas 2 and 3, $R_3$ to $R_9$ may be each independently same or different and are hydrogen, —OH, —COOH, a straight or branched $C_1$ to $C_{10}$ alkyl, a straight or branched $C_1$ to $C_{10}$ alkoxyalkyl, or a straight or branched $C_1$ to $C_{10}$ alkyl containing an ester group;

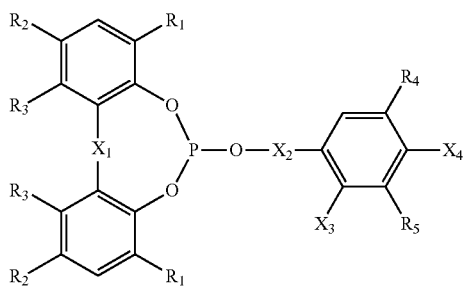
[Chemical Formula 4]

in Chemical Formula 4, $R_1$ to $R_5$ each independently represent hydrogen, an alkyl group having 3 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $X_1$ is a direct bond, oxygen, sulfur, or an alkylene group having 1 to 8 carbon atoms, $X_2$ is an alkylene group having 2 to 8 carbon atoms, and at least one of $X_3$ and $X_4$ is always a hydroxyl group and is hydrogen, an alkyl group having 1 to 8 carbon atoms, an alkoxy group having 1 to 8 carbon atoms, or an aralkyloxy group having 7 to 12 carbon atoms.

Hereinafter, the method of preparing the photocurable resin composition will be described in more detail by each step. The physical properties, kinds, and weights of the materials used in the method of preparing the photocurable resin composition are as described above.

Step (S1)

In step (S1), moisture may be removed from a mixture of a (meth)acrylate compound (A); a thiol compound containing two or more mercapto groups in one molecule (B); a photoinitiator (C); an organophosphate-based (meth)acrylate represented by Chemical Formula 1 above; and a phenolic compound represented by Chemical Formula 2 or 3 above, or a phosphate compound represented by following Chemical Formula 4 and containing phenolic —OH.

The organophosphate-based (meth)acrylate represented by Chemical Formula 1 above may be prepared by reacting a phosphorus pentoxide represented by following Chemical Formula 5 and a (meth)acrylate containing a hydroxyl group (—OH) represented by following Chemical Formula 6, and may be prepared by further reacting water together:

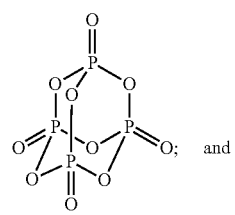
[Chemical Formula 5]

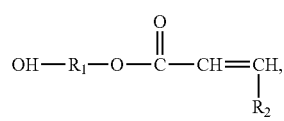
[Chemical Formula 6]

in Chemical Formula 6, $R_1$ is selected from following Chemical Formulas 1-1, 1-2, 1-3, and 1-4, and $R_2$ is hydrogen or methyl:

[Chemical Formula 1-1]

[Chemical Formula 1-2]

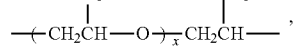
[Chemical Formula 1-3]

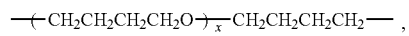
[Chemical Formula 1-4]

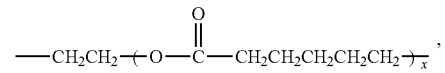

in Chemical Formulas 1-1 to 1-4, X may be each independently same or different and is an integer of 0 to 10.

For example, 1 to 8 moles of (meth)acrylate including a hydroxyl group represented by Chemical Formula 5 and 0 to 2 moles of water may be reacted based on 1 mole of phosphorus pentoxide represented by Chemical Formula 5 above. Preferably, 3 to 6 moles of (meth)acrylate including a hydroxyl group represented by Chemical Formula 6 and 1 to 2 moles of water may be reacted based on 1 mole of phosphorus pentoxide represented by Chemical Formula 5 above. Wherein, the sum of the (meth)acrylate including a hydroxyl group represented by Chemical Formula 6 above and water may be preferably 6 to 8 moles. In addition, when water reacts with 1 mole of phosphorus pentoxide represented by Chemical Formula 5 above in excess of 2 moles, phosphoric acid containing no (meth)acrylate functional group is formed, and thus white turbidity phenomenon may occur upon mixing of the organophosphate-based (meth)acrylate represented by Chemical Formula 1 above with the thio-ene composition.

In addition, moisture may be removed after mixing each material as described above, and the moisture removal may be performed under a temperature of 20 to 150° C. and a pressure of 0.1 to 2 torr, preferably under a temperature of 40 to 70° C. and a pressure of 0.5 To 1.5 torr. When the temperature is less than the above range or the pressure is equal to or more than the above range, the removal of moisture may not go smoothly, and thus the moisture may affect the quantum dot particles, thereby lowering the luminance and making smooth color conversion difficult. In addition, when the temperature is equal to or more than the above range or the pressure is equal to or less than the above range, process cost increases and the viscosity change of the photocurable resin composition becomes large, and thus the storage stability of the quantum dot composition to which the photocurable resin composition has been applied is lowered, thereby increasing a viscosity and altering the color of the composition to make it difficult to produce a uniform optical film, such as a quantum dot film, and to lower the color quality of the display.

In addition, it is possible to minimize the moisture in the photocurable resin composition through the moisture removal process. The amount of moisture in the photocurable resin composition may be controlled to 200 ppm or less, preferably 100 ppm or less, more preferably 30 ppm or less through the moisture removal process. If the moisture is more than the above range, damage to the quantum dot particles may occur due to the moisture, and thus color conversion may not go smoothly and typically partial decolorization may proceed. It is ideally good to completely remove the amount of moisture in the photocurable resin composition through the moisture removal process, but removing moisture completely may result in an increase in process cost or a decrease in productivity, and thus, considering them, more than a certain ratio of moisture may be contained. In view of the process cost or productivity, the amount of moisture that may be contained may be in the range of 1 to 200 ppm, preferably 5 to 100 ppm, more preferably 10 to 30 ppm.

Step (S2)

In the step (S2), the photocurable resin composition may be obtained by adding a quantum dot particle (D) and a scattered particle (E) to the mixture from which the moisture is removed, and mixing them.

Optical Film

The present invention also relates to an optical film comprising the photocurable resin composition.

The optical film may comprise a coating layer of the photocurable resin composition on at least one surface of the substrate.

The substrate is not particularly limited as long as it can be used as the substrate of the optical film. For example, the substrate may be a polyethylene terephthalate film, a polycarbonate film, a polypropylene film, a polyethylene film, a polystyrene film, or a polyepoxy film.

The coating layer of the photocurable resin composition may be appropriately adjusted according to its use and, for example, may be 50 to 100 nm when applied to the transparent display field.

In the present invention, the optical film may be a quantum dot film.

The optical film comprises a first barrier layer; a second barrier layer; and a quantum dot layer located between the first barrier layer and the second barrier layer, wherein the quantum dot layer may be formed of the photocurable resin composition.

In the present invention, the quantum dot layer may be formed by the photocurable resin composition.

Generally, since nanoscale quantum dots are easily affected by external factors such as moisture or oxygen, there is a problem in a short lifespan.

In the present invention, in order to compensate and improve such problems of quantum dots, a quantum dot layer made of the photocurable resin composition in the form of a composite with polymers, such as organophosphate-based (meth)acrylate represented by Chemical Formula 1 above and a phenolic compound represented by Chemical Formula 2 or 3 above, that is, a quantum dot-polymer composite is provided.

In addition, in order to ensure the efficiency and color purity of the quantum dot included in the quantum dot layer made of the photocurable resin composition in the form of the quantum dot-polymer composite, a layer serving as a passivation layer is required on the surface of the quantum dot layer.

Thus, the quantum dot film according to the present invention may comprise a barrier layer for protecting the quantum dot layer from moisture or oxygen.

In the present invention, the barrier layers, which are referred to as first and second barrier layers, respectively, may be formed on both surfaces of the quantum dot layer.

The barrier layer may include a substrate and a metal oxide deposited on at least one surface of the substrate.

The substrate is not particularly limited as long as it is a transparent substrate, specifically, the substrate may be an optically transparent substrate, for example, a substrate having a wavelength of 400 nm to 700 nm and a transmittance of 90% or more.

The substrate may include one or more polymers selected from the group consisting of: a polyester selected from poly(meth)acrylate, polyethylene terephthalate, polybutylene terephthalate, and polyethylene naphthalate; a polyolefin selected from polycarbonate, polyethylene, and polypropylene; a vinyl polymer selected from polyvinylacetate and polystyrene; a cyclic olefin polymer (COP); a polyimide; an aliphatic or aromatic polyamide (for example, nylon, aramid, and the like); a polyether ether ketone; a polysulfone; a polyethersulfone; a polyamideimide; a polyetherimide; and a thiol-ene polymer. Preferably, the substrate may include polyethylene terephthalate having excellent heat resistance and optical properties.

In addition, the metal oxide may be used by appropriately selecting its size and kind within a range that does not affect the performance of other components such as light emitting property.

The metal oxide may be at least one selected from the group consisting of silicon oxide, silicon nitride, silicon carbide, silicon oxynitride, silicon oxycarbide, aluminum oxide, aluminum nitride, aluminum carbide, aluminum oxynitride, aluminum oxycarbide, titanium oxide, titanium nitride, titanium carbide, titanium oxynitride, and titanium oxycarbide.

In addition, the metal oxide may have a size of 0.05 to 10 µm, preferably 0.1 to 8 µm, more preferably 1 to 5 µm. If it is less than the above range, blocking property against moisture and oxygen may be lowered, and if it is more than the above range, transparency may be lowered, and thus it may be difficult to apply to a transparent display.

In addition, the metal oxide may be deposited on the substrate to a thickness of 0.01 to 2 µm, preferably 0.05 to 1 µm, more preferably 0.08 to 0.5 µm. If it is less than the above range, blocking property against moisture and oxygen may be lowered, and if it is more than the above range, transparency may be lowered, and thus it may be difficult to apply to a transparent display.

Method for Preparing Optical Film

The present invention also relates to a method of preparing an optical film comprising the photocurable resin composition.

The optical film may be prepared by applying the photocurable resin composition on at least one surface of the substrate as described above and curing to form a coating layer. Wherein, the curing may be ultraviolet curing.

The light source of the active energy ray used in the ultraviolet curing is not particularly limited, but specific examples may include black light, UV-LED lamp, high pressure mercury lamp, pressurized mercury lamp, metal halide lamp, xenon lamp, and electrodeless discharge lamp. Of these light sources, black light and LED lamp (UV-LED lamp) are preferable in terms of safety and economy.

In addition, the light source irradiation amount of the active energy ray may be an amount sufficient for curing the photocurable resin composition, and may be selected according to the composition of the photocurable resin composition, the amount, thickness, and shape of the cured product to be formed, and the like. For example, when cured by irradiating an ultraviolet rays to the thin film (for example, the coating film formed by the applying method) of the photocurable resin composition, the light quantity may be set as 200 mJ/cm$^2$ or more and 5000 mJ/cm$^2$ or less, more preferably, the light quantity may be 500 mJ/cm$^2$ or more and 3000 mJ/cm$^2$ or less.

The present invention also relates to a method of preparing a quantum dot film comprising a first barrier layer; a second barrier layer; and a quantum dot layer located between the first barrier layer and the second barrier layer and including the photocurable resin composition, as described above.

The quantum dot film may be prepared by forming a coating layer of the photocurable resin composition on the first barrier layer, laminating the second barrier layer thereon, and then performing ultraviolet curing. The ultraviolet curing method is as described above.

Hereinafter, preferred examples will be provided to help understanding the present invention, but the following examples are only for illustrating the present invention. It will be apparent to those skilled in the art that various changes and modifications may be made within the scope and technical spirit of the present invention, and it is obvious that such changes and modifications fall within the scope of the appended claims.

Preparation Example: Preparation of Quantum Dot Particles 0.2 mmol of indium acetate, 0.6 mmol of palmitic acid, and 10 mL of 1-octadecene were placed in a reactor and heated to 120° C. under vacuum. After several hours, the atmosphere in the reactor was switched to nitrogen. After heating to 280° C., a mixed solution of 0.1 mmol of tris(trimethylsilyl)phosphine and 0.5 mL of trioctylphosphine was rapidly injected therein and reacted for 20 minutes. Acetone was added to the reaction solution cooled to room temperature rapidly, and the precipitate obtained by centrifugation was dispersed in toluene.

The obtained InP semiconductor nanocrystals had a particle size determined according to the reaction time and exhibited a UV maximum wavelength of 420 to 600 nm depending on the particle size. 0.3 mmol (0.056 g) of zinc acetate, 0.6 mmol (0.189 g) of oleic acid, and 10 mL of trioctylamine were placed in the reaction flask and vacuum-treated at 120° C. for 10 minutes. The inside of the reaction flask was replaced with N$_2$, and then heated to 220° C.

Toluene dispersion of the prepared InP semiconductor nanocrystals, 0.15 mL of 1-octadecane, and 0.6 mmol of TOPS (sulfur dispersed/dissolved in trioctylphosphine) were placed in the reaction flask, heated to 30° C., and reacted for 30 minutes. After the reaction was completed, the reaction solution was rapidly cooled to room temperature to obtain a reactant including InP/ZnS quantum dots.

Excess ethanol was added to the reactant including the InP/ZnS quantum dots and centrifuged to remove excess organic matter present in the quantum dots. After centrifugation, the supernatant was discarded, and the centrifuged precipitate was dried, and then dispersed in toluene, and then red light emission or green light emission could be confirmed by measuring a UV-vis absorption spectrum. The particle size of the red light emitting particles was 5 to 10 nm, the maximum peak of the absorption spectrum was 540 nm, the half width was 41 nm, the particle size of the green light emitting particles was 8 to 15 nm, the maximum peak of the absorption spectrum was 625 nm, and the half width was 45 nm. By the above method, a dispersion of each red or green light emitting quantum dot particle was prepared.

Synthesis Example 1

To a 1000 mL three-necked glass reactor equipped with a mechanical stirrer and a thermometer, 288.3 parts by weight (2.0 mol) of 2-hydroxypropyl methacrylate and 7.2 parts by weight (0.4 mol) of water were added and mixed by stirring. 113.6 parts by weight (0.4 mol) of phosphorus pentoxide was added in portions while paying attention to exotherm, and a mixture of methacryloyloxypropyl dihydrogen phosphate (60%) and dimethacryloyloxypropyl hydrogen phosphate (40%) was prepared while adjusting the internal temperature so as not to exceed 40° C. The chemical structure of the material was confirmed by H-NMR and FT-IR in FIG. 1.

Synthesis Example 2

To a 1000 mL three-necked glass reactor equipped with a mechanical stirrer and a thermometer, 248.6 parts by weight (1.8 mol) of 4-hydroxybutyl acrylate and 10.8 parts by weight (0.6 mol) of water were added and mixed by stirring. 113.6 parts by weight (0.4 mol) of phosphorus pentoxide was added in portions while paying attention to exotherm, and a mixture of acryloyloxybutyl dihydrogen phosphate (70%) and diacryloyloxybutyl hydrogen phosphate (30%) was prepared while adjusting the internal temperature so as not to exceed 40° C. The chemical structure of the material was confirmed by H-NMR in FIG. 2.

Synthesis Example 3

To a 500 mL three-necked glass reactor equipped with a mechanical stirrer and a thermometer, 312.3 parts by weight (2.4 mol) of 2-hydroxyethyl methacrylate was added and mixed by stirring. 56.8 parts by weight (0.2 mol) of phosphorus pentoxide was added in portions while paying attention to exotherm, and a mixture of methacryloyloxyethyl dihydrogen phosphate (50%) and dimethacryloyloxyethyl hydrogen phosphate (50%) was prepared while adjusting the internal temperature so as not to exceed 40° C. The chemical structure of the material was confirmed by H-NMR in FIG. 3.

Examples 1 to 5 and Comparative Examples 1 to 4

(1) Preparation of Photocurable Resin Composition

According to the composition as described in following Table 1, after a (meth)acrylate mixture (A), a thiol mixture (B), a photoinitiator (C), an organophosphate compound, and a phenolic compound were mixed, the water removal process was performed for 1 hour under 60° C. and a reduced pressure of 1 torr. However, the water removal step was not performed in Comparative Example 4.

Quantum dot particles (D) and scattered particles (E) were added to the mixture from which the moisture was removed, and uniformly mixed at a speed of 500 rpm using a high speed stirrer to prepare a photocurable resin composition. In this case, as the quantum dot particles (D), red light emitting particles and blue light emitting particles were used in a weight ratio of 3:7.

(2) Preparation of Quantum Dot Film

In order to form first and second barrier layers, a polyethylene terephthalate film (A4300; Toyobo Co., Ltd.) having a thickness of 50 μm, in which silicon oxide was deposited to a thickness of 0.1 μm, was used as first and second films.

The photocurable resin compositions prepared in Examples 1 to 5 and Comparative Examples 1 to 4, respectively, were filtered through a 0.2 μm Teflon filter, and then depressurized for 30 minutes to completely remove bubbles.

After the photocurable resin composition was coated on one surface of the first film using a micro bar, the second film was laminated on a coating layer of the photocurable resin composition, and ultraviolet curing was performed. A rubber roll was used to prevent bubbles from occurring upon laminating. In addition, a UV curing system (UVMH1001; Lichtzen Co., Ltd.) equipped with a metal halide lamp was used as the ultraviolet curing equipment, and the light quantity in the UVA region measured using UV Puck II (EIT Co., Ltd.) was 1500 mJ. The thickness of the quantum dot layer formed by curing the photocurable resin composition was maintained at 50±2 μm.

TABLE 1

| Raw Material (Unit: wt %) | | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| (Meth)acrylate mixture (A) | M300 | 30 | 30 | 50 | — | 66 | 32 | 30 | 67 | 30 |
| | M200 | 20 | 20 | 15 | 50 | — | 20 | 20 | — | 20 |
| | EB-600 | 5 | — | — | 7 | — | 5 | — | — | 5 |
| | EB-830 | — | 6 | 10 | — | — | — | 6 | — | — |
| Tiol mixture (B) | PEMP | 40 | — | 20 | 35 | 30 | 40 | — | 30 | 40 |
| | PE-1 | — | 40 | — | — | — | — | 40 | — | — |
| Photoinitiator (C) | I-184 | 1.5 | 1.5 | 1.5 | 1 | 1.5 | 1.5 | 1.5 | 1.5 | 1.5 |
| | D-TPO | 1 | 1.4 | 1.5 | 1.5 | 1.5 | 1 | 1.5 | 1.5 | 1 |
| Quantum dot particle (D) | Preparation Example | 2 | 2 | 2 | 2 | 2 | 2 | 2 | 2 | 2 |
| Scattered particle (E) | FINEX 30 | 3 | 3 | 3 | 3 | 3 | 3 | 3 | 3 | 3 |
| Organophosphate-based compound | Synthesis Example 1 | 2 | 1 | — | — | — | — | 1 | — | 2 |
| | Synthesis Example 2 | — | — | 1.5 | — | — | — | — | — | — |
| | Synthesis Example 3 | — | — | — | 5 | 1.5 | — | — | — | — |
| Phenolic compound | HQMME | 0.5 | 0.1 | — | — | 0.5 | 0.5 | — | — | 0.5 |
| | THQ | — | — | 0.5 | 0.5 | — | — | — | — | — |
| Water removal process | | ○ | ○ | ○ | ○ | ○ | ○ | ○ | ○ | X |

M300: Trimethylolpropane triacrylate (Miwon Specialty Chemical Co., Ltd.)
M200: Hexanediol diacrylate (Miwon Specialty Chemical Co., Ltd.)
EB-600: Bisphenol A epoxy acrylate (Alex Co., Ltd.)
EB-830: Hexafunctional polyester acrylate (Alex Co., Ltd.)
PEMP: Pentaerythritol tetramercaptoacetate (SC Organic Chemical Co., Ltd.)
PE-1: Pentaerythritol tetrakis (3-mercaptobutylate) (Showa Denko K.K.)
I-184: 1-Hydroxycyclohexyl-phenyl-ketone (IGM Co., Ltd.)
D-TPO: 2,4,6-Tribenzoyl diphenylphosphine oxide (IGM Co., Ltd.)
HQMME: Methoxy hydroquinone (Eastman Company)
THQ: Toluhydroquinone (Eastman Company)
FINEX 30: Zinc oxide (Sakai Chemical Industry Co., Ltd., average particle diameter of 35 nm)

Examples 6 to 9 and Comparative Examples 5 to 8

(1) Preparation of Photocurable Resin Composition

According to the composition as described in following Table 2, after a (meth)acrylate mixture (A), a thiol mixture (B), a photoinitiator (C), an organophosphate compound of Chemical Formula 1, and a phosphate compound containing phenolic —OH, of Chemical Formula 4 were mixed, the water removal process was performed for 1 hour under 60° was laminated on a coating layer of the photocurable resin composition, and ultraviolet curing was performed. A rubber roll was used to prevent bubbles from occurring upon laminating. In addition, a UV curing system (UVMH1001; Lichtzen Co., Ltd.) equipped with a metal halide lamp was used as the ultraviolet curing equipment, and the light quantity in the UVA region measured using UV Puck II (EIT Co., Ltd.) was 1500 mJ. The thickness of the quantum dot layer formed by curing the photocurable resin composition was maintained at 50±2 μm.

TABLE 2

| Raw Material (Unit: wt %) | | Example 6 | Example 7 | Example 8 | Example 9 | Comparative Example 5 | Comparative Example 6 | Comparative Example 7 | Comparative Example 8 |
|---|---|---|---|---|---|---|---|---|---|
| (Meth) acrylate mixture (A) | M300 | 30 | 30 | 50 | — | 32 | 30 | 67 | 30 |
| | M200 | 20 | 20 | 15 | 50 | 20 | 20 | — | 20 |
| | EB-600 | 5 | — | — | 7 | 5 | — | — | 5 |
| | EB-830 | — | 6 | 10 | — | — | 6 | — | — |
| Tiol mixture (B) | PEMP | 40 | — | 20 | 35 | 40 | — | 30 | 40 |
| | PE-1 | — | 40 | — | — | — | 40 | — | — |
| Photoinitiator (C) | I-184 | 1.5 | 1.5 | 1.5 | 1 | 1.5 | 1.5 | 1.5 | 1.5 |
| | D-TPO | 1 | 1.4 | 1.5 | 1.5 | 1 | 1.5 | 1.5 | 1 |
| Quantum dot particle (D) | Preparation Example | 2 | 2 | 2 | 2 | 2 | 2 | 2 | 2 |
| Scattered particle (E) | FINEX 30 | 3 | 3 | 3 | 3 | 3 | 3 | 3 | 3 |
| Organophosphate-based compound | Synthesis Example 3 | 2 | 1 | 1.5 | 5 | — | 1 | — | 2 |
| Phosphate compound | Sumi-GP | 0.5 | 0.1 | 0.5 | 0.5 | 0.5 | — | — | 0.5 |
| Water removal process | | ○ | ○ | ○ | ○ | ○ | ○ | ○ | X |

M300: Trimethylolpropane triacrylate (Miwon Specialty Chemical Co., Ltd.)
M200: Hexanediol diacrylate (Miwon Specialty Chemical Co., Ltd.)
EB-600: Bisphenol A epoxy acrylate (Alex Co., Ltd.)
EB-830: Hexafunctional polyester acrylate (Alex Co., Ltd.)
PEMP: Pentaerythritol tetramercaptoacetate (SC Organic Chemical Co., Ltd.)
PE-1: Pentaerythritol tetrakis (3-mercaptobutylate) (Showa Denko K.K.)
I-184: 1-Hydroxycyclohexyl-phenyl-ketone (IGM Co., Ltd.)
D-TPO: 2,4,6-Tribenzoyl diphenylphosphine oxide (IGM Co., Ltd.)
FINEX 30: Zinc oxide (Sakai Chemical Industry Co., Ltd., average particle diameter of 35 nm)
Sumi-GP:2,4,8,10-Tetra-tert-butyl-6-[3-(3-methyl-4-hydroxy-5-tert-butylphenyl)proppoxy]dibenzo[d,f][1,3,2]dioxaphosphepine (Sumitomo Chemical Co., Ltd.)

C. and a reduced pressure of 1 torr. However, the water removal step was not performed in Comparative Example 8.

Quantum dot particles (D) and scattered particles (E) were added to the mixture from which the moisture was removed, and uniformly mixed at a speed of 500 rpm using a high speed stirrer to prepare a photocurable resin composition. In this case, as the quantum dot particles (D), red light emitting particles and blue light emitting particles were used in a weight ratio of 3:7.

(2) Preparation of Quantum Dot Film

In order to form first and second barrier layers, a polyethylene terephthalate film (A4300; Toyobo Co., Ltd.) having a thickness of 50 μm, in which silicon oxide was deposited to a thickness of 0.1 μm, was used as first and second films.

The photocurable resin compositions prepared in Examples 6 to 9 and Comparative Examples 5 to 8, respectively, were filtered through a 0.2 μm Teflon filter, and then depressurized for 30 minutes to completely remove bubbles.

After the photocurable resin composition was coated on one surface of the first film using a micro bar, the second film Experimental Example 1

The photocurable resin compositions or the quantum dot films prepared in Examples 1 to 9 and Comparative Examples 1 to 8, respectively, were measured for viscosity, moisture content, adhesion between barrier films, luminance, and edge decolorization according to the method as described below.

(1) Viscosity Measurement

Viscosity was measured using a DV-2+ model (Brookfield Co., Ltd.) connected to a constant-temperature water bath. The temperature was maintained at 25° C., 1 mL of photocurable resin composition samples were taken, and the viscosity value was displayed. Storage stability was confirmed by displaying the ratio (V2/V1) of the initial viscosity (V1) measured after mixing and the viscosity value measured after standing in a 60° C. oven for 10 days (V2).

(2) Moisture Content Measurement

The moisture content of the photocurable resin composition samples was measured using a vaporization type moisture meter. The amount of evaporated moisture was measured using the vaporizer, ADP-611 (Kyoto Electronics Manufacturing Co., Ltd.) combined with the Karl Fischer moisture meter, MKC-710M (Kyoto Electronics Manufacturing Co., Ltd.). The amount of vaporized moisture was determined by measuring about 0.1 g of photocurable resin composition for 10 minutes with 99.999% ultrapure nitrogen at a flow rate of 100 mL/min, at a heating temperature of 120° C.

was marked with Δ; if there was obvious decolorization on three or more surfaces of four surfaces, it was marked with X.

Following Table 3 shows results of viscosity, moisture content, adhesion between barrier films, luminance, and edge decolorization measured according to the method as described above for the photocurable resin compositions or the quantum dot films prepared in Examples 1 to 5 and Comparative Examples 1 to 4, respectively.

TABLE 3

| Example | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|
| Moisture content (ppm) | 15 | 10 | 11 | 27 | 12 | 16 | 14 | 16 | 630 |
| Viscosity change (V2/V1) | 1.2 | 1.3 | 1.1 | 1.0 | 1.5 | Gelation | 3.1 | Gelation | 1.7 |
| Adhesion between Barrier Films | ○ | ○ | ○ | Δ | ○ | Δ | Δ | X | Δ |
| Initial luminance Y (cd/m²) | 592.9 | 590.4 | 593.1 | 590.3 | 590.1 | 588.6 | 589.4 | 590.1 | 593.1 |
| High Temperature Luminance (Y (%)) | 590.1 (99.5) | 587.3 (99.5) | 590.1 (99.5) | 588.7 (99.7) | 587.9 (99.6) | 501.6 (85.2) | 499.8 (84.8) | 485.6 (82.3) | 440.1 (74.2) |
| High temperature and high humidity luminance (Y (%)) | 527.4 (89.0) | 520.9 (88.2) | 522.7 (88.1) | 518.6 (87.9) | 519.9 (88.1) | 412.3 (70.0) | 409.4 (69.5) | 400.5 (67.9) | 374.4 (63.1) |
| Edge decolorization | ◉ | ◉ | ◉ | ○ | ◉ | Δ | Δ | Δ | X |

(3) Adhesion Between Barrier Films

For the prepared quantum dot films, when peeling between two films (first and second films) by hand, if the films (first and second films) were broken without peeling, it was judged that the adhesion was excellent, and it was marked with ○; if the films were difficult to peel but were not broken, it was marked with Δ; if the films were easily peeled off, it was marked with X.

(4) Luminance Measurement

The prepared quantum dot film was cut to A4 size, the cut films were mounted on the center part of the back light of Samsung SUHD TV JS6500 model, and the power was applied, and then the average value was calculated by measuring the luminance (Y) of 13 points using a luminance meter (CS-2000, Minolta Co., Ltd.). Compared with the initial luminance, the change rate (Y (%)) relative to the initial luminance were measured based on the luminance (Y) after standing at an internal heat (80° C.) and a high temperature and high humidity (90° C., 60%) for 250 hours.

(5) Edge Decolorization

The quantum dot film was cut to A4 size, the cut films were left for 48 hours under the temperature of 85° C. and humidity of 85%, the left films were mounted on the center part of the back light of Samsung SUHD TV JS6500 model, and the power was applied, and then after visually checking the decolorization phenomenon at each edge, if there was no decolorization, it was marked with ◉; if there was a little decolorization, it was marked with ○; if there was obvious decolorization on two or more surfaces of four surfaces, it Referring to Table 3 above, it can be seen that in the photocurable resin compositions and the quantum dot films of Examples 1 to 5 in which all raw materials are contained in an appropriate content, the viscosity change is small, the adhesion between the barrier films and the luminance under high temperature and high humidity are excellent, and decolorization does not occur.

In contrast, it was confirmed that in Comparative Examples 1 and 3 in which the organophosphate metacrylate-based material was not contained, gelation occurred, the adhesion between the barrier films and the luminance under high temperature and high humidity were not good, and some decolorization occurred.

In addition, it was confirmed that in Comparative Example 2 in which the phenolic compound material was not contained, the viscosity change was slightly higher, the adhesion between the barrier films and the luminance under high temperature and high humidity were remarkably lowered, and some decolorization occurred.

In addition, it was exhibited that in Comparative Example 4 which was not subjected to the moisture process, overall physical properties were lowered, particularly, the luminance under high temperature and high humidity was remarkably lowered, and a decolorization occurred severely.

Following Table 4 shows results of viscosity, moisture content, adhesion between barrier films, luminance, and edge decolorization measured according to the method as described above for the photocurable resin compositions or the quantum dot films prepared in Examples 6 to 9 and Comparative Examples 5 to 8, respectively.

TABLE 4

| | Example 6 | Example 7 | Example 8 | Example 9 | Comparative Example 5 | Comparative Example 6 | Comparative Example 7 | Comparative Example 8 |
|---|---|---|---|---|---|---|---|---|
| Moisture content (ppm) | 15 | 10 | 11 | 27 | 16 | 14 | 16 | 630 |
| Viscosity change (V2/V1) | 1.2 | 1.3 | 1.1 | 1.0 | Gelation | 3.1 | Gelation | 1.7 |
| Adhesion between Barrier Films | ○ | ○ | ○ | Δ | Δ | Δ | X | Δ |
| Initial luminance Y (cd/m$^2$) | 592.9 | 590.4 | 593.1 | 590.3 | 588.6 | 589.4 | 590.1 | 593.1 |
| High Temperature Luminance (Y (%)) | 590.1 (99.5) | 587.3 (99.5) | 590.1 (99.5) | 588.7 (99.7) | 501.6 (85.2) | 499.8 (84.8) | 485.6 (82.3) | 440.1 (74.2) |
| High temperature and high humidity luminance (Y (%)) | 527.4 (89.0) | 520.9 (88.2) | 522.7 (88.1) | 518.6 (87.9) | 412.3 (70.0) | 409.4 (69.5) | 400.5 (67.9) | 374.4 (63.1) |
| Edge decolorization | ◎ | ◎ | ◎ | ○ | Δ | Δ | Δ | X |

Referring to Table 4 above, it can be seen that in the photocurable resin compositions and the quantum dot films of Examples 6 to 9 in which all raw materials are contained in an appropriate content, the viscosity change is small, the adhesion between the barrier films and the luminance under high temperature and high humidity are excellent, and decolorization does not occur.

In contrast, it was confirmed that in Comparative Example 6 in which the phosphate compound containing phenolic —OH was not contained, the viscosity change was slightly higher, the adhesion between the barrier films and the luminance under high temperature and high humidity were remarkably lowered, and some decolorization occurred.

In addition, it was confirmed that in Comparative Examples 5 and 7 in which the organophosphate metacrylate-based material was not contained, gelation occurred, the adhesion between the barrier films and the luminance under high temperature and high humidity were not good, and some decolorization occurred.

In addition, it was exhibited that in Comparative Example 8 which was not subjected to the moisture process, overall physical properties were lowered, particularly, the luminance under high temperature and high humidity was remarkably lowered, and a decolorization occurred severely.

The invention claimed is:

1. A photocurable resin composition comprising a (meth)acrylate compound (A); a thiol compound containing two or more mercapto groups in one molecule (B); and a photoinitiator (C), wherein the photocurable resin composition comprises an organophosphate-based (meth)acrylate represented by following Chemical Formula 1; and a phenolic compound represented by following Chemical Formula 2 or 3, or a phosphate compound represented by following Chemical Formula 4 and containing phenolic —OH:

[Chemical Formula 1]

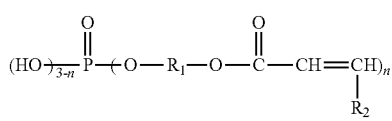

in Chemical Formula 1, $R_1$ is selected from following Chemical Formulas 1-1 to 1-4, $R_2$ is hydrogen or methyl, and n is an integer of 1 to 3:

[Chemical Formula 1-1]

[Chemical Formula 1-2]
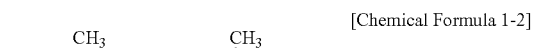

[Chemical Formula 1-3]

[Chemical Formula 1-4]

in Chemical Formulas 1-1 to 1-4, X may be each independently same or different and is an integer of 0 to 10;

[Chemical Formula 2]
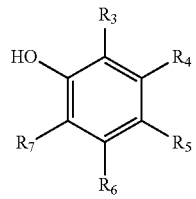

[Chemical Formula 3]
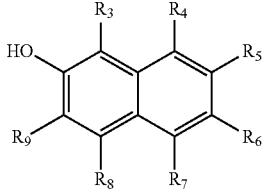

in Chemical Formulas 2 and 3, $R_3$ to $R_9$ may be each independently same or different and are hydrogen, —OH, —COOH, a straight or branched $C_1$ to $C_{10}$ alkyl, a straight or branched $C_1$ to $C_{10}$ alkoxyalkyl, or a straight or branched $C_1$ to $C_{10}$ alkyl containing an ester group;

[Chemical Formula 4]

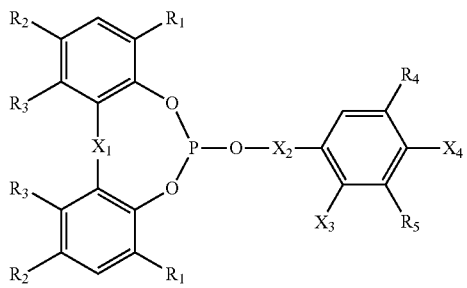

in Chemical Formula 4, $R_1$ to $R_5$ each independently represent hydrogen, an alkyl group having 3 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $X_1$ is a direct bond, oxygen, sulfur, or an alkylene group having 1 to 8 carbon atoms, $X_2$ is an alkylene group having 2 to 8 carbon atoms, and at least one of $X_3$ and $X_4$ is always a hydroxyl group and is hydrogen, an alkyl group having 1 to 8 carbon atoms, an alkoxy group having 1 to 8 carbon atoms, or an aralkyloxy group having 7 to 12 carbon atoms.

2. The photocurable resin composition according to claim 1, wherein the photocurable resin composition comprises:
50 to 80% by weight of (meth)acrylate compound (A);
15 to 45% by weight of thiol compound containing two or more mercapto groups in one molecule (B);
0.1 to 10% by weight of photoinitiator (C);
0.01 to 5% by weight of organophosphate-based (meth)acrylate represented by Chemical Formula 1 above; and
0.01 to 5% by weight of phenolic compound represented by Chemical Formula 2 or 3 above, or 0.1 to 10% by weight of phosphate compound represented by Chemical Formula 4 above and containing phenolic —OH.

3. The photocurable resin composition according to claim 1, wherein the photocurable resin composition comprises 0.1 to 1.2 equivalents of thiol compound containing two or more mercapto groups in one molecule (B) based on 1 equivalent of (meth)acrylate compound (A).

4. The photocurable resin composition according to claim 1, wherein the (meth)acrylate compound (A) is one or more selected from the group consisting of a (meth)acrylated monomer, an urethane (meth)acrylate oligomer, a polyester (meth)acrylate oligomer, and an epoxy (meth)acrylate oligomer.

5. The photocurable resin composition according to claim 1, wherein the thiol compound containing two or more mercapto groups in one molecule (B) is one or more selected from the group consisting of a polythiol, an aliphatic polythiol, an aromatic polythiol, and an ester polythiol.

6. The photocurable resin composition according to claim 1, wherein the photoinitiator (C) comprises one or more selected from the group consisting of an acylphosphine oxide-based photoinitiator, an α-hydroxyalkylphenone-based photoinitiator, an α-aminoalkylphenone-based photoinitiator, a benzoineether-based photoinitiator, an α,α-dialkoxyacetophenone-based photoinitiator, and a phenylglyoxylate-based photoinitiator.

7. The photocurable resin composition according to claim 1, wherein the photocurable resin composition further comprises one or more selected from a quantum dot particle (D) and a scattered particle (E).

8. The photocurable resin composition according to claim 7, wherein:
the quantum dot particle (D) is comprised in an amount of 0.1 to 2% by weight based on the total weight of the photocurable resin composition, and
the scattered particle (E) is comprised in an amount of 0.1 to 15% by weight based on the total weight of the photocurable resin composition.

9. The photocurable resin composition according to claim 7, wherein the quantum dot particle (D) comprises a core layer and a shell layer located outside the core layer, wherein at least one of the core layer and the shell layer is doped with at least one of aluminum, silicon, titanium, magnesium, and zinc, and the core layer comprises Groups III-V compounds.

10. The photocurable resin composition according to claim 7, wherein the scattered particle (E) is one or more selected from the group consisting of silica, alumina, silicon, titanium dioxide ($TiO_2$), zirconia ($ZrO_2$), barium sulfate, zinc oxide (ZnO), poly(methylmethacrylate) (PMMA), and a benzoguanamine-based polymer, and is a particle having an average particle diameter of 10 to 100 nm.

11. The photocurable resin composition according to claim 1, wherein the photocurable resin composition has a viscosity change rate ($\Delta V$) defined by following Equation 1 of 2.0 or less:

$$\Delta V = V_2/V_1,\quad\text{[Equation 1]}$$

in Equation 1, $V_1$ is the initial viscosity at 25° C., and $V_2$ is the viscosity at 25° C. after stored for 30 days at 60° C.

12. The photocurable resin composition according to claim 1, wherein the photocurable resin composition comprises moisture of 200 ppm or less.

13. A method of preparing a photocurable resin composition, the method comprising: (S1) the step of removing moisture from a mixture of a (meth)acrylate compound (A); a thiol compound containing two or more mercapto groups in one molecule (B); and a photoinitiator (C); an organophosphate-based (meth)acrylate represented by following Chemical Formula 1; and a phenolic compound represented by following Chemical Formula 2 or 3, or a phosphate compound represented by following Chemical Formula 4 and containing phenolic —OH:

[Chemical Formula 1]

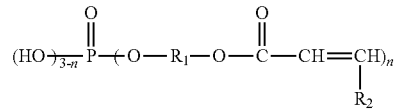

in Chemical Formula 1, $R_1$ is selected from following Chemical Formulas 1-1 to 1-4, $R_2$ is hydrogen or methyl, and n is an integer of 1 to 3:

[Chemical Formula 1-1]
$$-(CH_2CH_2O)_{\overline{x}}-CH_2CH_2-$$

[Chemical Formula 1-2]
$$-(CH_2\underset{|}{\overset{CH_3}{CH}}-O)_{\overline{x}}-CH_2\underset{|}{\overset{CH_3}{CH}}-$$

[Chemical Formula 1-3]
$$-(CH_2CH_2CH_2CH_2O)_{\overline{x}}-CH_2CH_2CH_2CH_2-$$

[Chemical Formula 1-4]

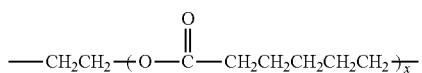

in Chemical Formulas 1-1 to 1-4, X may be each independently same or different and is an integer of 0 to 10;

[Chemical Formula 2]

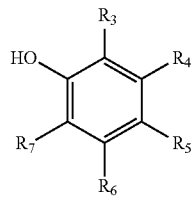

[Chemical Formula 3]

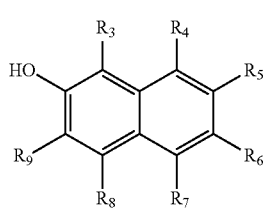

in Chemical Formulas 2 and 3, $R_3$ to $R_9$ may be each independently same or different and are hydrogen, —OH, —COOH, a straight or branched $C_1$ to $C_{10}$ alkyl, a straight or branched $C_1$ to $C_{10}$ alkoxyalkyl, or a straight or branched $C_1$ to $C_{10}$ alkyl containing an ester group;

[Chemical Formula 4]

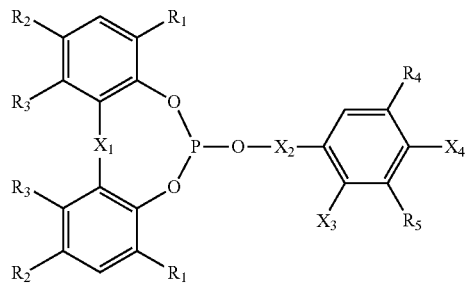

in Chemical Formula 4, $R_1$ to $R_5$ each independently represent hydrogen, an alkyl group having 3 to 8 carbon atoms, a cycloalkyl group having 5 to 8 carbon atoms, an alkylcycloalkyl group having 6 to 12 carbon atoms, an aralkyl group having 7 to 12 carbon atoms, or a phenyl group, $X_1$ is a direct bond, oxygen, sulfur, or an alkylene group having 1 to 8 carbon atoms, $X_2$ is an alkylene group having 2 to 8 carbon atoms, and at least one of $X_3$ and $X_4$ is always a hydroxyl group and is hydrogen, an alkyl group having 1 to 8 carbon atoms, an alkoxy group having 1 to 8 carbon atoms, or an aralkyloxy group having 7 to 12 carbon atoms.

14. The method according to claim 13, wherein the organophosphate-based (meth)acrylate represented by Chemical Formula 1 above is prepared by reacting a phosphorus pentoxide represented by following Chemical Formula 5 and a (meth)acrylate containing a hydroxyl group (—OH) represented by following Chemical Formula 6:

[Chemical Formula 5]

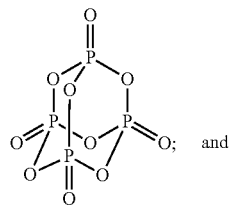

and

[Chemical Formula 6]

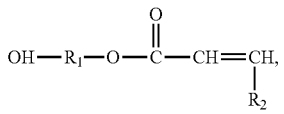

in Chemical Formula 6, $R_1$ is selected from following Chemical Formulas 1-1, 1-2, 1-3, and 1-4, and $R_2$ is hydrogen or methyl:

[Chemical Formula 1-1]

[Chemical Formula 1-2]

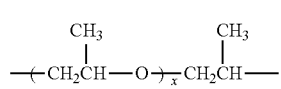

[Chemical Formula 1-3]

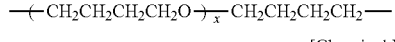

[Chemical Formula 1-4]

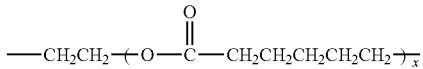

in Chemical Formulas 1-1 to 1-4, X may be each independently same or different and is an integer of 0 to 10.

15. The method according to claim 14, wherein the reaction is performed by adding water upon reacting.

16. The method according to claim 13, wherein the step (S1) comprises removing moisture under a temperature of 20 to 150° C. and a pressure of 0.1 to 2 torr.

17. The method according to claim 13, wherein after the step (S1), the method further comprises (S2) the step of adding one or more selected from a quantum dot particle (D) and a scattered particle (E) to the mixture from which the moisture is removed, and mixing them.

18. An optical film comprising the photocurable resin composition according to claim 1.

19. The optical film according to claim 18, wherein the optical film is a quantum dot film.

20. The optical film according to claim 18,
wherein the optical film is a quantum dot film,
wherein the quantum dot film comprises a first barrier layer; a second barrier layer; and a quantum dot layer located between the first barrier layer and the second barrier layer,
wherein the quantum dot layer is formed of the photocurable resin composition.

* * * * *